US012562792B2

(12) United States Patent
Rahman et al.

(10) Patent No.: US 12,562,792 B2
(45) Date of Patent: Feb. 24, 2026

(54) METHOD AND APPARATUS FOR CSI CONFIGURATION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 17/586,582

(22) Filed: Jan. 27, 2022

(65) Prior Publication Data

US 2022/0255603 A1 Aug. 11, 2022

Related U.S. Application Data

(60) Provisional application No. 63/237,409, filed on Aug. 26, 2021, provisional application No. 63/148,070, filed on Feb. 10, 2021.

(51) Int. Cl.
*H04W 24/10* (2009.01)
*H04B 7/06* (2006.01)

(52) U.S. Cl.
CPC ......... *H04B 7/0617* (2013.01); *H04B 7/0626* (2013.01); *H04B 7/0634* (2013.01); *H04B 7/0639* (2013.01); *H04W 24/10* (2013.01)

(58) Field of Classification Search
None
See application file for complete search history.

(56) References Cited

U.S. PATENT DOCUMENTS 10,237,110 B2 * 3/2019 Kim .................... H04L 7/042
2016/0150572 A1 * 5/2016 Quan ................ H04W 74/0833
370/329

(Continued)

FOREIGN PATENT DOCUMENTS

JP 2020137087 A * 8/2020
WO WO-2011124021 A1 * 10/2011 .......... H04B 7/0417

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.

(Continued)

*Primary Examiner* — Lance Leonard Barry

(57) ABSTRACT

A method for operating a user equipment (UE) comprises receiving configuration information about a channel state information (CSI) report, the configuration information including information about a number M; identifying determining a value of M and a value of a parameter R based on the value of M such that when M=1, R is set to 1 and when M=2, R is configured based on a higher layer parameter for R∈S, where S is a set of values and the set S={1,2}; determining, based on a condition on the value of M, a value of a parameter R; determining a precoding matrix indicator (PMI) indicating N precoding matrices, where the number N is determined based on the determined value of R; determining the CSI report including the PMI; and transmitting the CSI report.

11 Claims, 13 Drawing Sheets

(56) References Cited

U.S. PATENT DOCUMENTS

| | | | | |
|---|---|---|---|---|
| 2017/0302353 A1* | 10/2017 | Rahman | ............... | H04B 7/0478 |
| 2019/0280750 A1* | 9/2019 | Rahman | ............ | H04L 25/03923 |

FOREIGN PATENT DOCUMENTS

| | | | | | |
|---|---|---|---|---|---|
| WO | WO-2020031057 A1 | * | 2/2020 | ........... | H04N 19/109 |
| WO | WO-2020151760 A1 | * | 7/2020 | ........... | H04B 7/0417 |
| WO | WO-2020225642 A1 | * | 11/2020 | ........... | H04B 7/0478 |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"LTE; Evolved Universal Terrestrial Radio Access (E-UTRA); Medium Access Control (MAC) protocol specification 3GPP TS 36.321 version 16.6.0 Release 16)", ETSI TS 136 321 V16.6.0, Oct. 2021, 144 pages.

"LTE; Evolved Universal Terrestrial Radio Access (E-UTRA); Radio Resource Control (RRC); Protocol specification (3GPP TS 36.331 version 16.7.0 Release 16)", ETSI TS 136 331 V16.7.0, Jan. 2022, 1099 pages.

"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

Extended European Search Report issued Jun. 11, 2024 regarding Application No. 22753010.2, 12 pages.

CATT, "CSI Enhancements for Rel-17", 3GPP TSG RAN WG1 Meeting #105-e, R1-2104488, May 2021, 19 pages.

Japanese Patent Office, Office Action issued Jul. 29, 2024 regarding Application No. 2023-548748, 9 pages.

International Search Report and Written Opinion issued May 25, 2022 regarding Application No. PCT/KR2022/002056, 7 pages.

Nokia et al., "Enhancement on CSI measurement and reporting", 3GPP TSG RAN WG1 Meeting #104-e, R1-2101011, Jan. 2021, 21 pages.

"3rd Generation Partnership Project; Technical Specification Group Radio Access Network; NR; Physical layer procedures for data (Release 16)", 3GPP TS 38.214 V16.4.0, Dec. 2020, 169 pages.

Huawei et al., "Summary of CSI enhancements for MTRP and FDD (Round 1)", 3GPP TSG RAN WG1 Meeting #104-e, R1-2101885, Jan. 2021, 17 pages.

Japanese Patent Office, Notice of Final Rejection issued Mar. 4, 2025 regarding Application No. 2023-548748, 9 pages.

Japanese Patent Office, Notification of Reconsideration Report issued Jul. 31, 2025 regarding Application No. 2023-548748, 6 pages.

\* cited by examiner

500

600

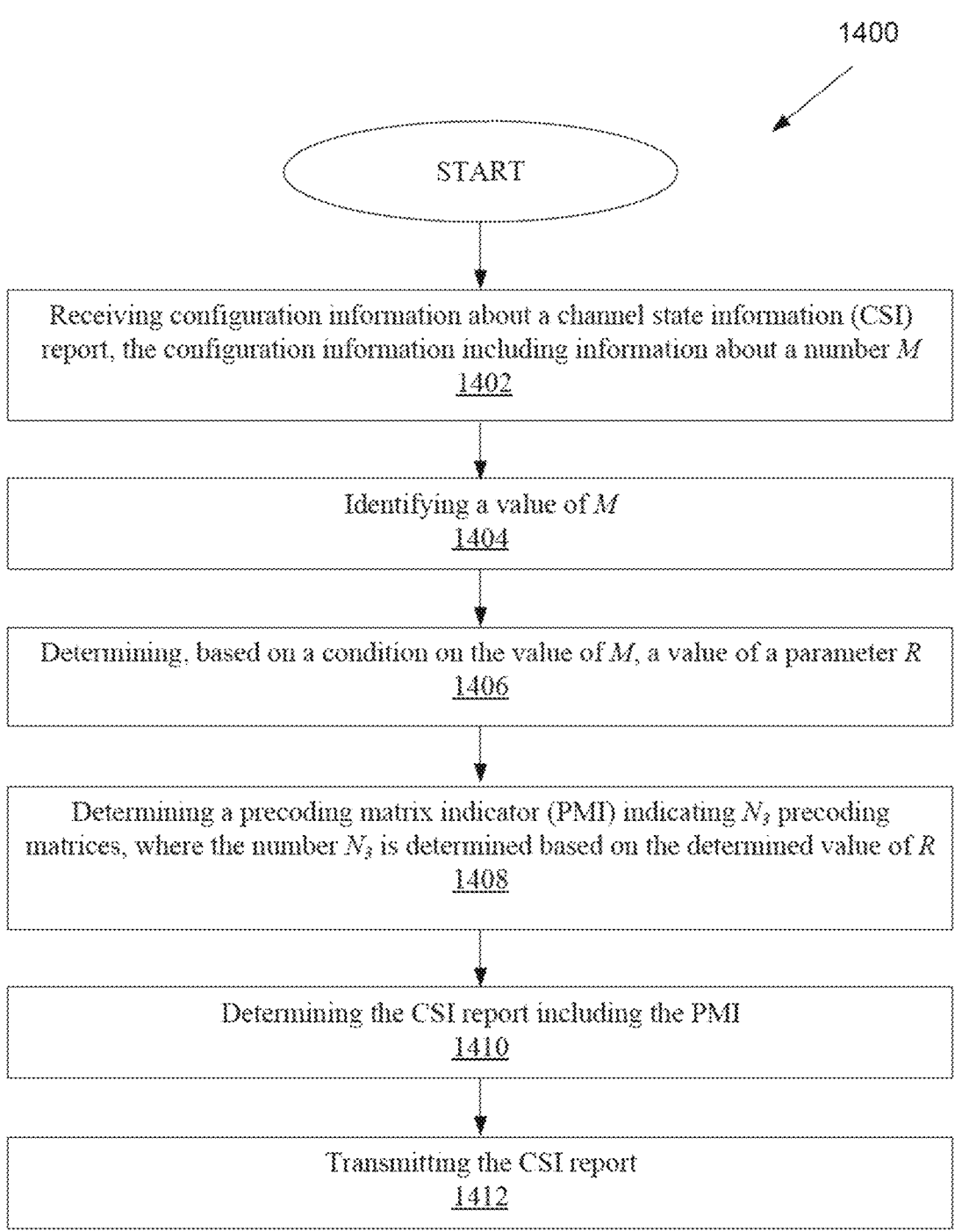

1400

START

Receiving configuration information about a channel state information (CSI) report, the configuration information including information about a number $M$
1402

Identifying a value of $M$
1404

Determining, based on a condition on the value of $M$, a value of a parameter $R$
1406

Determining a precoding matrix indicator (PMI) indicating $N_3$ precoding matrices, where the number $N_3$ is determined based on the determined value of $R$
1408

Determining the CSI report including the PMI
1410

Transmitting the CSI report
1412

FIG. 14

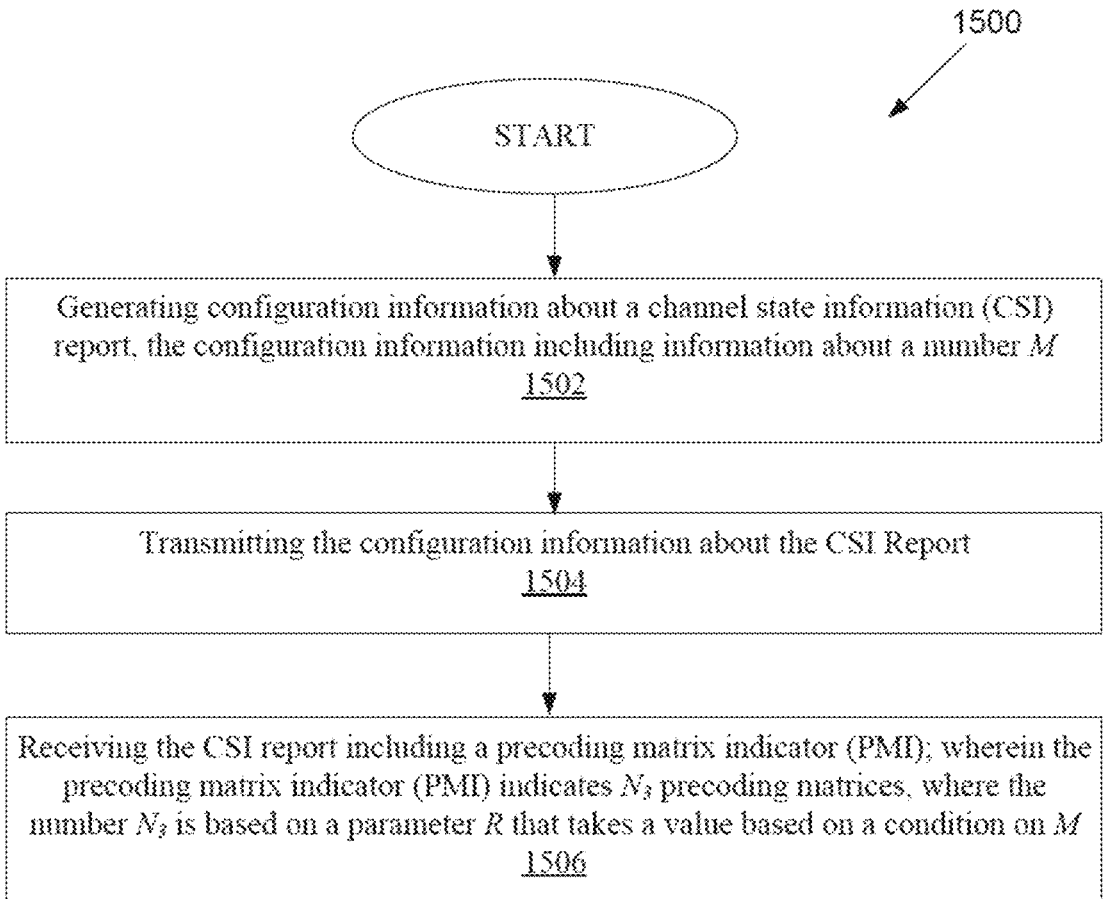

1500

START

Generating configuration information about a channel state information (CSI) report, the configuration information including information about a number $M$
1502

Transmitting the configuration information about the CSI Report
1504

Receiving the CSI report including a precoding matrix indicator (PMI), wherein the precoding matrix indicator (PMI) indicates $N_3$ precoding matrices, where the number $N_3$ is based on a parameter $R$ that takes a value based on a condition on $M$
1506

FIG. 15

METHOD AND APPARATUS FOR CSI CONFIGURATION

CROSS-REFERENCE TO RELATED APPLICATIONS AND CLAIM OF PRIORITY

The present application claims priority to U.S. Provisional Patent Application No. 63/148,070, filed on Feb. 10, 2021, and U.S. Provisional Patent Application No. 63/237,409, filed on Aug. 26, 2021. The content of the above-identified patent documents is incorporated herein by reference.

TECHNICAL FIELD

The present disclosure relates generally to wireless communication systems and more specifically to CSI configuration.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable channel state information (CSI) configuration in a wireless communication system.

In one embodiment, a UE for CSI reporting in a wireless communication system is provided. The UE includes a transceiver configured to receive configuration information about a channel state information (CSI) report, the configuration information including information about a number M. The UE further includes a processor operably connected to the transceiver. The processor is configured to identify a value of M, determine, based on a condition on the value of M, a value of a parameter R, determine a precoding matrix indicator (PMI) indicating $N_3$ precoding matrices, where the number $N_3$ is determined based on the determined value of R, and determine the CSI report including the PMI. The transceiver is further configured to transmit the CSI report.

In another embodiment, a BS in a wireless communication system is provided. The BS includes a processor configured to generate configuration information about a channel state information (CSI) report, the configuration information including information about a number M. The BS further includes a transceiver operably connected to the processor. The transceiver is configured to: transmit the configuration information about the CSI report, and receive the CSI report including a precoding matrix indicator (PMI); wherein the precoding matrix indicator (PMI) indicates $N_3$ precoding matrices, where the number $N_3$ is based on a parameter R that takes a value based on a condition on M.

In yet another embodiment, a method for operating a UE is provided. The method comprises: receiving configuration information about a channel state information (CSI) report, the configuration information including information about a number M; identifying a value of M; determining, based on a condition on the value of M, a value of a parameter R; determining a precoding matrix indicator (PMI) indicating $N_3$ precoding matrices, where the number $N_3$ is determined based on the determined value of R; determining the CSI report including the PMI; and transmitting the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 illustrates a flow chart of a method for operating a UE according to embodiments of the present disclosure; and FIG. 15 illustrates a flow chart of a method for operating a BS according to embodiments of the present disclosure.

DETAILED DESCRIPTION

Figure 1:
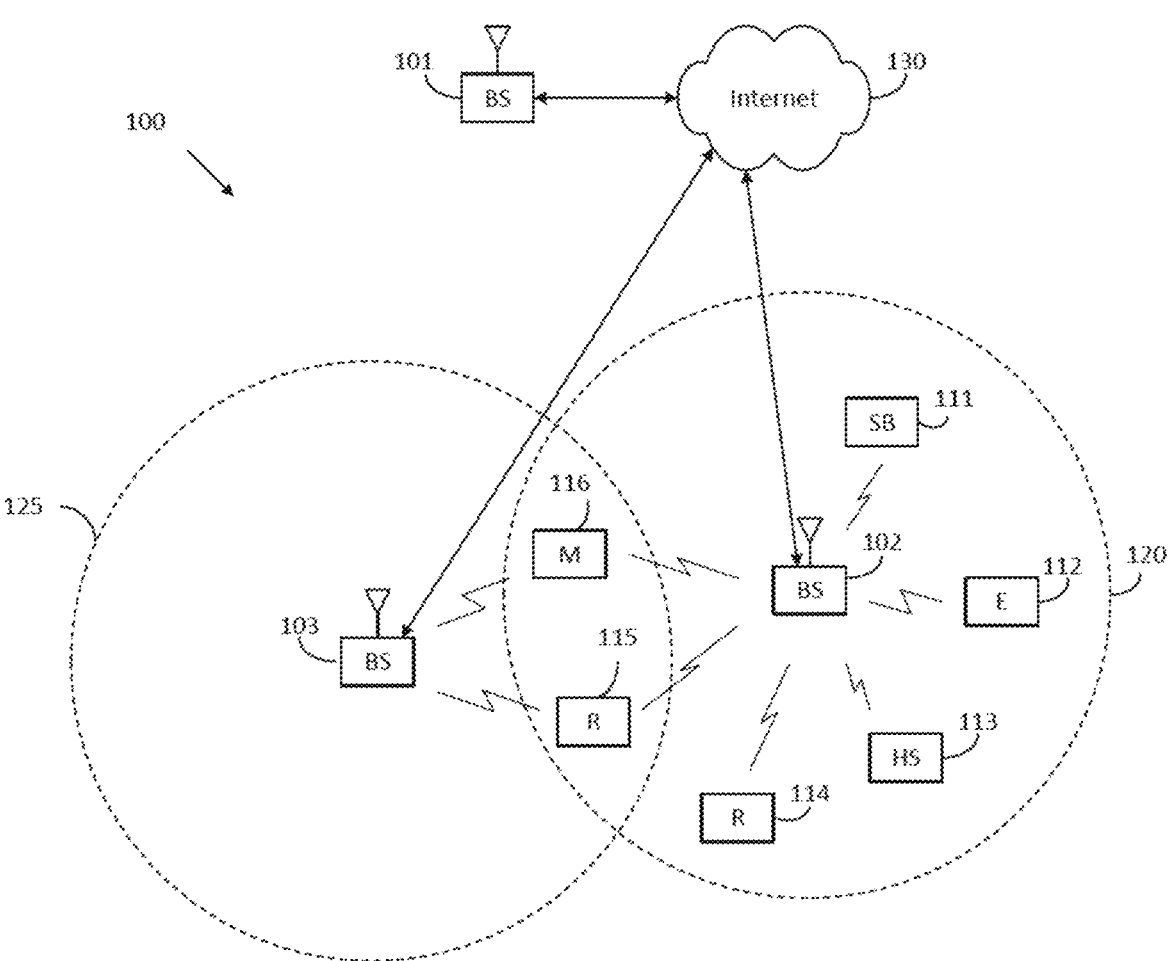
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5");

3GPP TR 22.891 v14.2.0 (herein "REF 6"); 3GPP TS 38.212 v17.0.0, "E-UTRA, NR, Multiplexing and channel coding" (herein "REF 7"); and 3GPP TS 38.214 v17.0.0, "E-UTRA, NR, Physical layer procedures for data" (herein "REF 8").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
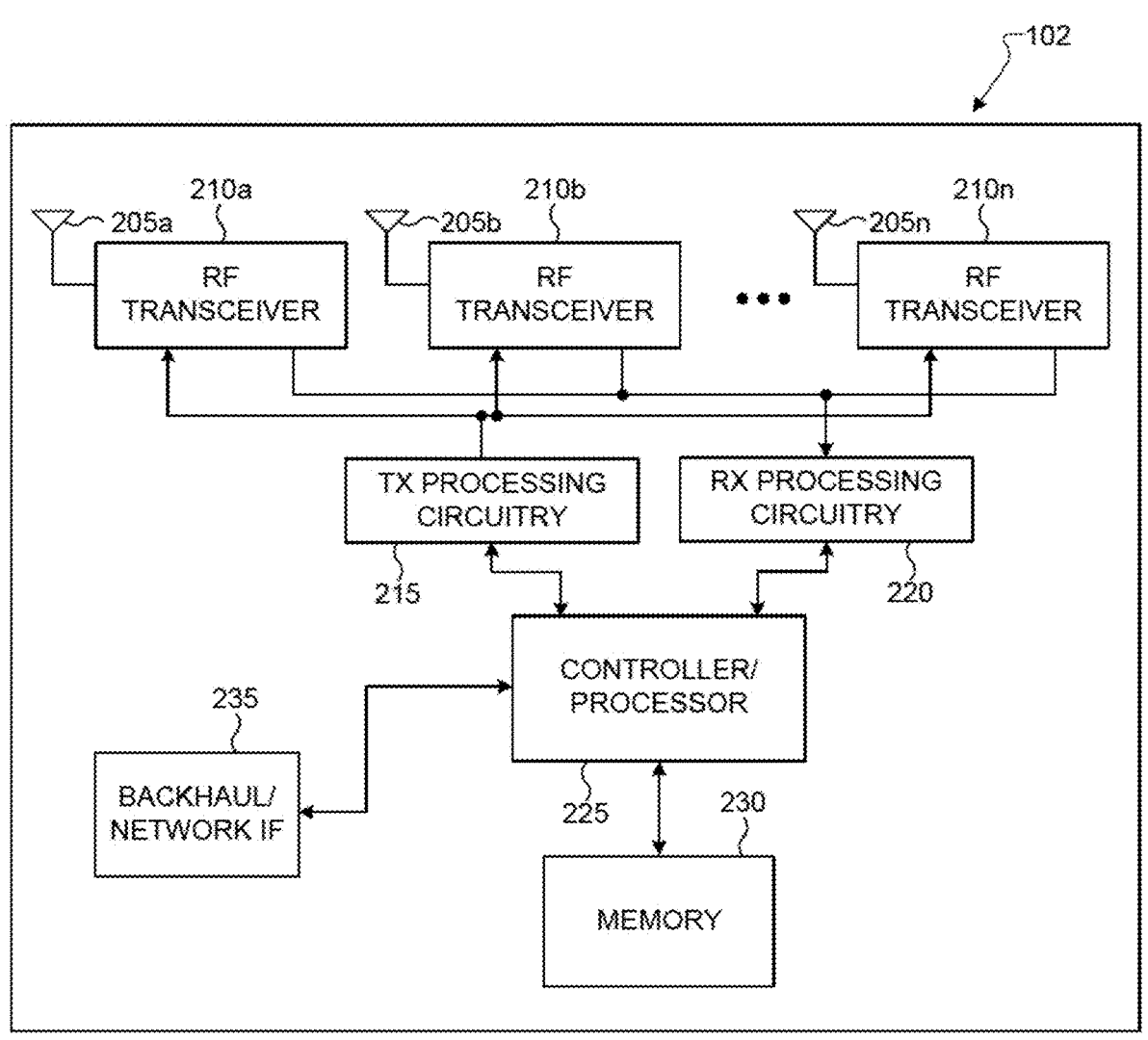
FIG. 2 illustrates an example gNB according to embodiments of the present disclosure.
Figure 3:
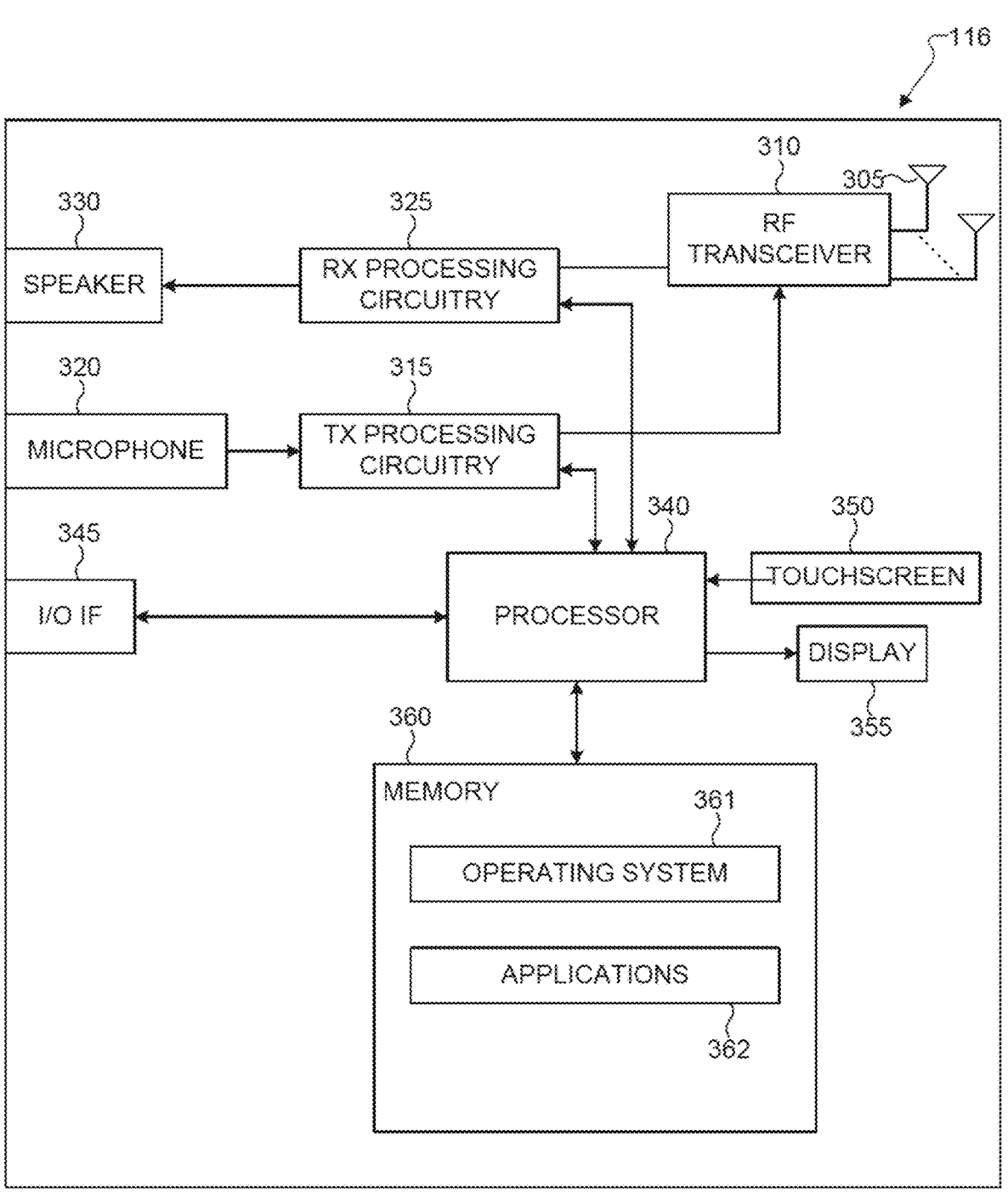
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information about a channel state information (CSI) report, the configuration information including information about a number M; identifying a value of M; determining, based on a condition on the value of M, a value of a parameter R; determining a precoding matrix indicator (PMI) indicating $N_3$ precoding matrices, where the number $N_3$ is determined based on the determined value of R; determining the CSI report including the PMI; and transmitting the CSI report. and one or more of the gNBs 101-103 includes circuitry, programing, or a combination thereof, for generating configuration information about a channel state information (CSI) report, the configuration information including information about a number M; transmitting the configuration information about the CSI report, and receiving the CSI report including a precoding matrix indicator (PMI); wherein the precoding matrix indicator (PMI) indicates $N_3$ precoding matrices, where the number $N_3$ is based on a parameter R that takes a value based on a condition on M.

Although FIG. 1 illustrates one example of a wireless network, various changes may be made to FIG. 1. For example, the wireless network could include any number of gNB s and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information about a channel state information (CSI) report, the configuration information including information about a number M; identifying a value of M; determining, based on a condition on the value of M, a value of a parameter R; determining a precoding matrix indicator (PMI) indicating $N_3$ precoding matrices, where the number $N_3$ is determined based on the determined value of R; determining the CSI report including the PMI; and transmitting the CSI report. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
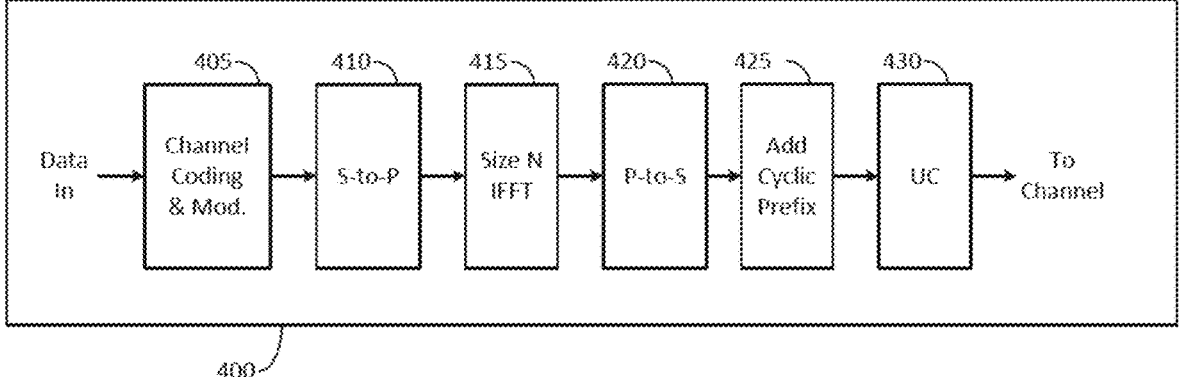
FIG. 4A illustrates a high-level diagram of an orthogonal frequency division multiple access transmit path according to embodiments of the present disclosure.
Figure 4B:
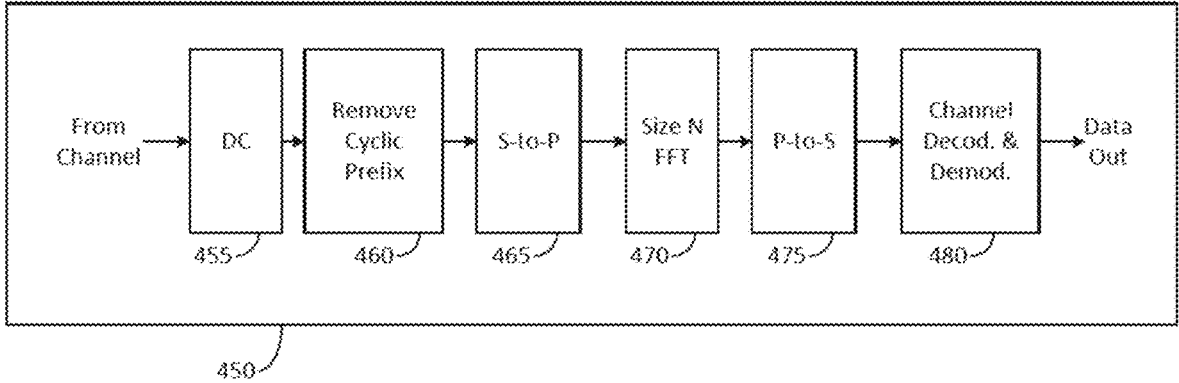
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for down-link communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path cir-cuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other compo-nents may be implemented by configurable hardware or a mixture of software and configurable hardware. In particu-lar, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier trans-form (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modu-lation block 405 receives a set of information bits, applies coding (e.g., LDPC coding) and modulates (e.g., quadrature phase shift keying (QPSK) or quadrature amplitude modu-lation (QAM)) the input bits to produce a sequence of frequency-domain modulation symbols. Serial-to-parallel block 410 converts (i.e., de-multiplexes) the serial modu-lated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain base-band signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNB s 101-103 and may implement a receive path corresponding to the architecture for receiving in the downlink from gNB s 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH}\cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB}\cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)$, where $N_{SRS}=1$ if a last subframe symbol is used to transmit SRS and $N_{SRS}=0$ otherwise.

Figure 5:
FIG. 5 illustrates a transmitter block diagram for a PDSCH in a subframe according to embodiments of the present disclosure.
Figure 5:
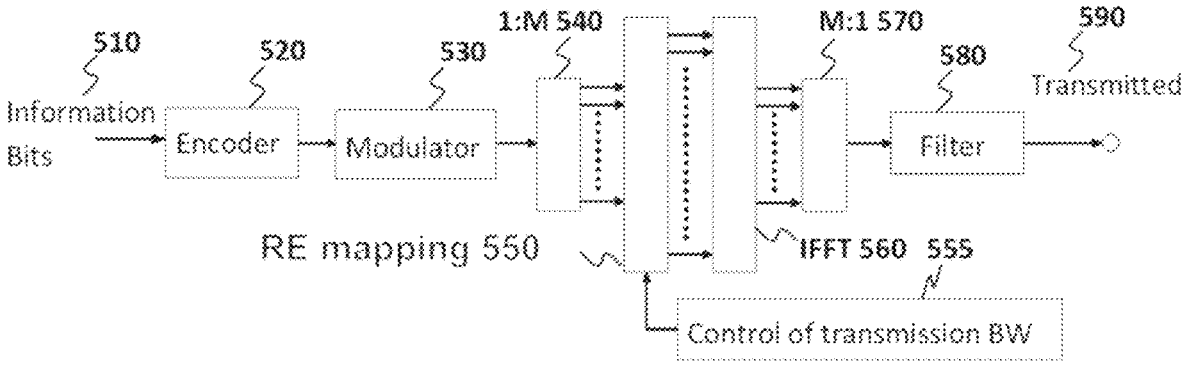

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
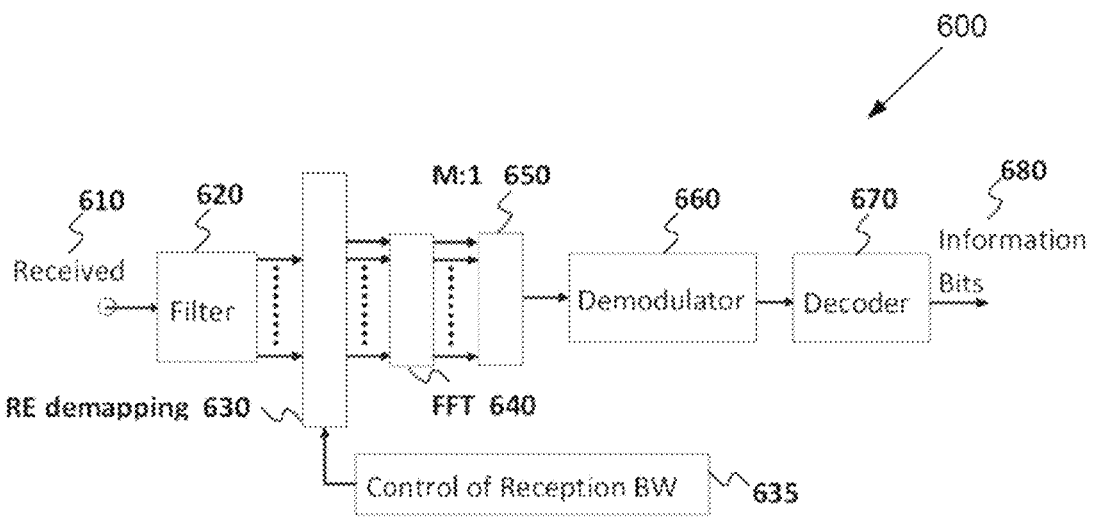
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figures 7, 8:
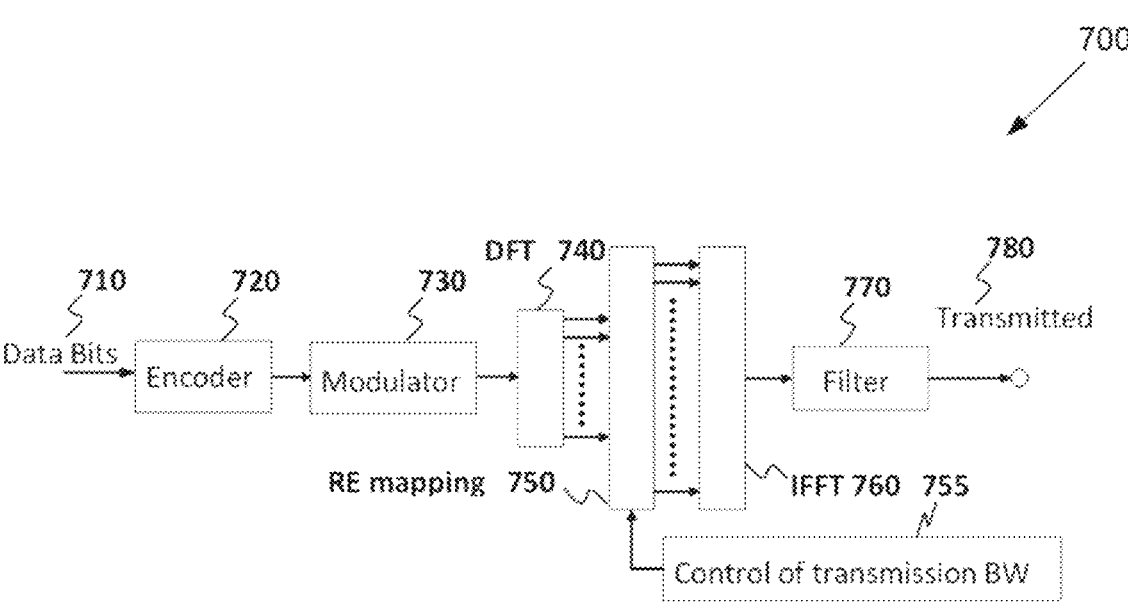
FIG. 7 illustrates a transmitter block diagram for a PUSCH in a subframe according to embodiments of the present disclosure.
FIG. 8 illustrates a receiver block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 9:
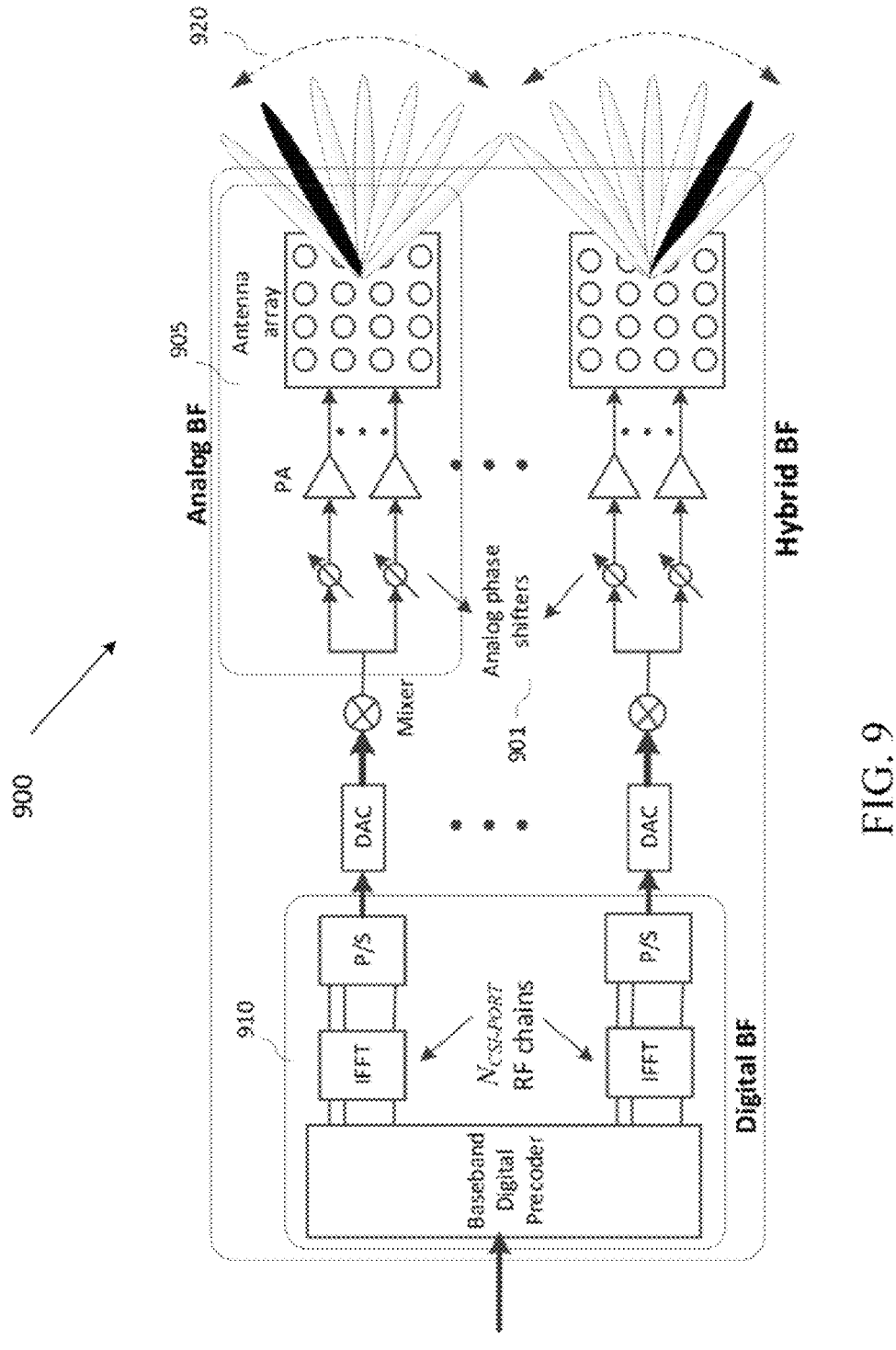
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 1100 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO. The overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REFS). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REFS), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

It has been known in the literature that UL-DL channel reciprocity exists in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. This disclosure provides some of design components of such a codebook.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 10:
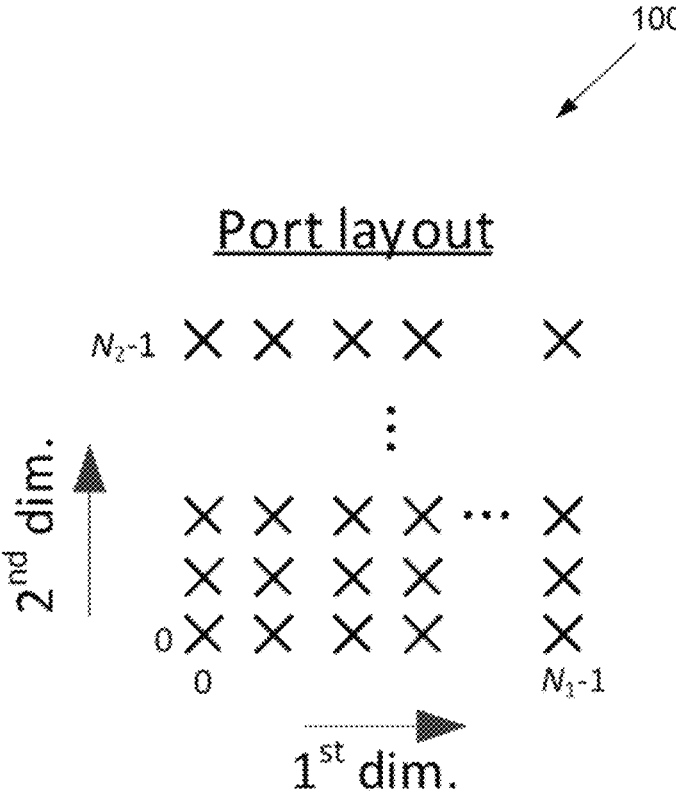
FIG. 10 illustrates an antenna port layout according to embodiments of the present disclosure.

FIG. 10 illustrates an example antenna port layout 1000 according to embodiments of the present disclosure. The embodiment of the antenna port layout 1000 illustrated in FIG. 10 is for illustration only. FIG. 10 does not limit the scope of this disclosure to any particular implementation of the antenna port layout 1000.

As illustrated in FIG. 10, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 11:
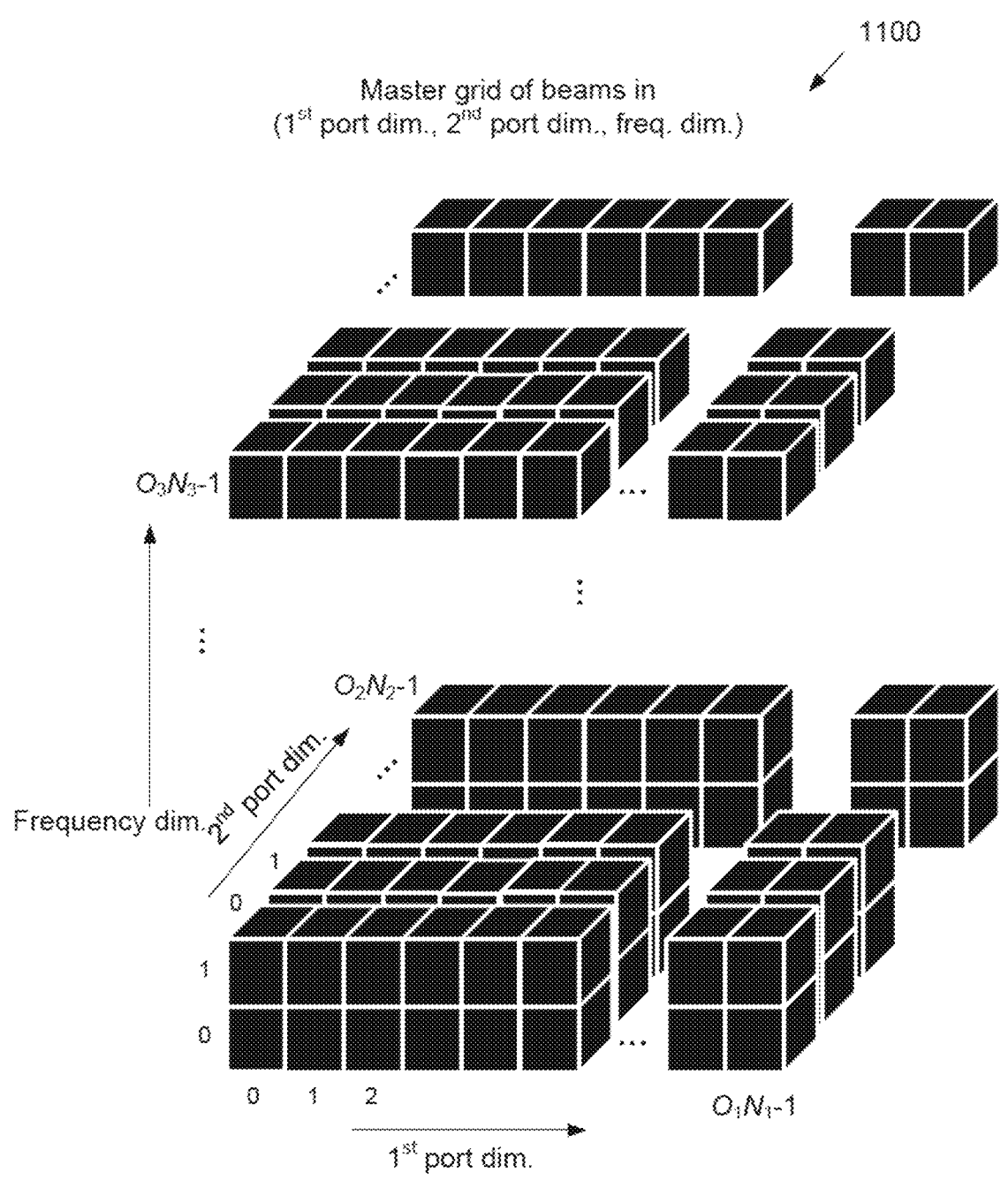
FIG. 11 illustrates a 3D grid of oversampled DFT beams according to embodiments of the present disclosure.

FIG. 11 illustrates a 3D grid 1300 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to $\{2, 4, 8\}$. In yet another example, at least one of $O_1$, $O_2$, and $O_3$ is higher layer configured (via RRC signaling).

As explained in Section 5.2.2.2.6 of REFS, a UE is configured with higher layer parameter codebookType set to 'typeII-PortSelection-r16' for an enhanced Type II CSI reporting in which the pre-coders for all SBs and for a given layer l=1, . . . , v, where v is the associated RI value, is given by either $$W^l = AC_l B^H = [a_0 \ a_1 \ \dots \ a_{L-1}] \quad \text{(Eq. 1)}$$

$$\begin{bmatrix} c_{l,0,0} & c_{l,0,1} & \dots & c_{l,0,M-1} \\ c_{l,1,0} & c_{l,1,1} & \dots & c_{l,1,M-1} \\ \vdots & \vdots & \vdots & \vdots \\ c_{l,L-1,0} & c_{l,L-1,1} & \dots & c_{l,L-1,M-1} \end{bmatrix}$$

$$[b_0 \ b_1 \ \dots \ b_{M-1}]^H$$

$$= \sum_{f=0}^{M-1} \sum_{k=0}^{L-1} c_{l,i,f} (a_i b_f^H)$$

$$= \sum_{k=0}^{L-1} \sum_{f=0}^{M-1} c_{l,i,f} (a_i b_f^H), \text{ or}$$

$$W^l = \begin{bmatrix} A & 0 \\ 0 & A \end{bmatrix} C_l B^H \quad \text{(Eq. 2)}$$

$$= \begin{bmatrix} a_0 \ a_1 \ \dots \ a_{L-1} & 0 \\ 0 & a_0 \ a_1 \ \dots \ a_{L-1} \end{bmatrix}$$

$$\begin{bmatrix} c_{l,0,0} & c_{l,0,1} & \dots & c_{l,0,M-1} \\ c_{l,1,0} & c_{l,1,1} & \dots & c_{l,1,M-1} \\ \vdots & \vdots & \vdots & \vdots \\ c_{l,L-1,0} & c_{l,L-1,1} & \dots & c_{l,L-1,M-1} \end{bmatrix}$$

$$[b_0 \ b_1 \ \dots \ b_{M-1}]^H$$

$$= \begin{bmatrix} \sum_{f=0}^{M-1} \sum_{k=0}^{L-1} c_{l,i,f} (a_i b_f^H) \\ \sum_{f=0}^{M-1} \sum_{k=0}^{L-1} c_{l,i+L,f} (a_i b_f^H) \end{bmatrix},$$

where $N_1$ is a number of antenna ports in a first antenna port dimension (having the same antenna polarization), $N_2$ is a number of antenna ports in a second antenna port dimension (having the same antenna polarization), $P_{CSI-RS}$ is a number of CSI-RS ports configured to the UE, $N_3$ is a number of SBs for PMI reporting or number of FD units or number of FD components (that comprise the CSI reporting band) or a total number of precoding matrices indicated by the PMI (one for each FD unit/component), $a_i$ is a $2N_1N_2\times1$ (Eq. 1) or $N_1N_2\times1$ (Eq. 2) column vector, and $a_i$ is a $N_1N_2\times1$ or $$\frac{P_{CSIRS}}{2} \times 1$$

port selection column vector if antenna ports at the gNB are co-polarized, and is a $2N_1N_2\times1$ or $P_{CSIRS}\times1$ port selection column vector if antenna ports at the gNB are dual-polarized or cross-polarized, where a port selection vector is a defined as a vector which contains a value of 1 in one element and zeros elsewhere, and $P_{CSIRS}$ is the number of CSI-RS ports configured for CSI reporting, $b_f$ is a $N_3\times1$ column vector, $c_{l,i,f}$ is a complex coefficient associate with vectors $a_i$ and $b_f$.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f}\times c_{l,i,f}$, where $x_{l,i,f}=1$ if the coefficient $c_{l,i,f}$ is reported by the UE according to some embodiments of this invention.

$x_{l,i,f}=0$ otherwise (i.e., $c_{l,i,f}$ is not reported by the UE).

The indication whether $x_{l,i,f}=1$ or 0 is according to some embodiments of this invention. For example, it can be via a bitmap.

In a variation, the precoder equations Eq. 1 or Eq. 2 are respectively generalized to $$W^l = \sum_{k=0}^{L-1} \sum_{f=0}^{M_i-1} c_{l,i,f} (a_i b_{i,f}^H) \text{ and} \quad \text{(Eq. 3)}$$

$$W^l = \begin{bmatrix} \sum_{k=0}^{L-1} \sum_{f=0}^{M_i-1} c_{l,i,f} (a_i b_{i,f}^H) \\ \sum_{k=0}^{L-1} \sum_{f=0}^{M_i-1} c_{l,i+L,f} (a_i b_{i,f}^H) \end{bmatrix}, \quad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}} [W^1 \ W^2 \ \dots \ W^R].$$

Eq. 2 is assumed in the rest of the disclosure. The embodiments of the disclosure, however, are general and are also application to Eq. 1, Eq. 3 and Eq. 4.

Here $$L \leq \frac{P_{CSI-RS}}{2}$$

US 12,562,792 B2

19 and $M \leq N_3$. If $$L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \left[ 1 \quad e^{j\frac{2\pi n_{3,l}^{(f)}}{O_3 N_3}} \quad e^{j\frac{2\pi, 2n_{3,l}^{(f)}}{O_3 N_3}} \quad \dots \quad e^{j\frac{2\pi (N_3-1) n_{3,l}^{(f)}}{O_3 N_3}} \right]^T.$$

When $O_3=1$, the FD basis vector for layer $l \in \{1, \dots, v\}$ (where v is the RI or rank value) is given by $$w_f = \left[ y_{0,l}^{(f)} \quad y_{1,l}^{(f)} \quad \dots \quad y_{N_3-1,l}^{(f)} \right]^T,$$

where $$y_{t,l}^{(f)} = e^{j\frac{2\pi t n_{3,l}^{(f)}}{N_3}}$$

and $n_{3,l}=[n_{3,l}^{(0)}, \dots, n_{3,l}^{(M-1)}]$ where $n_{3,l}^{(f)} \in \{0, 1, \dots, N_3-1\}$.

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos \frac{\pi(2m+1)n}{2K}, & n = 1, \dots K-1 \end{cases},$$

and $K=N_3$, and $m=0, \dots, N_3-1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W=A_l C_l B_l^H = w_1 \tilde{W}_2 W_f^H, \quad (5)$$

where $A=W_1$ corresponds to the Rel. 15 $W_1$ in Type II CSI codebook [REFS], and $B=W_f$.

The $C_1=\tilde{W}_2$ matrix consists of all the required linear combination coefficients (e.g., amplitude and phase or real or imaginary). Each reported coefficient ($c_{l,i,f}=p_{l,i,f}g_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling. In another example, the amplitude coefficient ($p_{l,i,f}$) is reported as $p_{l,i,f}=p_{l,i,f}^{(1)}p_{l,i,f}^{(2)}$ where $p_{l,i,f}^{(1)}$ is a reference or first amplitude which is reported using a A1-bit amplitude codebook where A1 belongs to {2, 3, 4}, and $p_{l,i,f}^{(2)}$ is a differential or second amplitude which is reported using a A2-bit amplitude codebook where A2<A1 belongs to {2, 3, 4}.

For layer 1, let us denote the linear combination (LC) coefficient associated with spatial domain (SD) basis vector (or beam) $i \in \{0, 1, \dots, 2L-1\}$ and frequency domain (FD) basis vector (or beam) $f \in \{0, 1, \dots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ}<K_0=[\beta \times 2LM]<2LM$ and $\beta$ is higher layer configured. The remaining $2LM-K_{NZ}$ coefficients that are not reported by the UE are assumed to be zero. The following quantization scheme is used to quantize/report the $K_{NZ}$ NZ coefficients.

The UE reports the following for the quantization of the NZ coefficients in $\tilde{W}_2$ A X-bit indicator for the strongest coefficient index (i*, f*), where $X=\lceil \log_2 K_{NZ} \rceil$ or $\lceil \log_2 2L \rceil$.

Strongest coefficient $c_{l,i^*,f^*}=1$ (hence its amplitude/phase are not reported)

Two antenna polarization-specific reference amplitudes is used.

For the polarization associated with the strongest coefficient $c_{l,i^*,f^*}=1$, since the reference amplitude $p_{l,i,f}^{(1)}=1$, it is not reported For the other polarization, reference amplitude $p_{l,i,f}^{(1)}$ is quantized to 4 bits The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \dots, \left(\frac{1}{2^{14}}\right)^{\frac{1}{4}} \right\}.$$

For $\{c_{l,i,f}, (i,f) \neq (i^*,f^*)\}$:

For each polarization, differential amplitudes $p_{l,i,f}^{(2)}$ of the coefficients calculated relative to the associated polarization-specific reference amplitude and quantized to 3 bits The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

Note: The final quantized amplitude $p_{l,i,f}$ is given by $p_{l,i,f}^{(1)} \times p_{l,i,f}^{(2)}$ Each phase is quantized to either 8PSK ($N_{ph}=8$) or 16PSK ($N_{ph}=16$) (which is configurable).

For the polarization $r^* \in \{0, 1\}$ associated with the strongest coefficient $c_{l,i^*,f^*}$, we have $$r^* = \left\lfloor \frac{i^*}{L} \right\rfloor$$

and the reference amplitude $p_{l,i,f}^{(1)}=p_{l,i,f}^{(2)}=1$. For the other polarization $r \in \{0, 1\}$ and $r \neq r^*$, we have $$r = \left(\left\lfloor \frac{i^*}{L} \right\rfloor + 1\right)$$

mod 2 and the reference amplitude $p_{l,i,f}^{(1)}=p_{l,r}^{(1)}$ is quantized (reported) using the 4-bit amplitude codebook mentioned above.

A UE can be configured to report M FD basis vectors. In one example, $$M = \left\lceil p \times \frac{N_3}{R} \right\rceil,$$

where R is higher-layer configured from {1, 2} and p is higher-layer configured from $$\left\{\frac{1}{4}, \frac{1}{2}\right\}.$$

In one example, the p value is higher-layer configured for rank 1-2 CSI reporting. For rank >2 (e.g., rank 3-4), the p value (denoted by $v_0$) can be different. In one example, for rank 1-4, $(p, v_0)$ is jointly configured from $$\left\{\left(\frac{1}{2}, \frac{1}{4}\right), \left(\frac{1}{4}, \frac{1}{4}\right), \left(\frac{1}{4}, \frac{1}{8}\right)\right\}, \text{ i.e., } M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3=N_{SB} \times R$ where $N_{SB}$ is the number of SBs for CQI reporting. In the rest of the disclosure, M is replaced with $M_v$ to show its dependence on the rank value v, hence p is replaced with $p_v$, $v \in \{1, 2\}$ and $v_0$ is replaced with $p_v$, $v \in \{3, 4\}$.

A UE can be configured to report $M_v$ FD basis vectors in one-step from $N_3$ basis vectors freely (independently) for each layer $l \in \{0, 1, \ldots, v-1\}$ of a rank v CSI reporting. Alternatively, a UE can be configured to report $M_v$ FD basis vectors in two-step as follows.

In step 1, an intermediate set (InS) comprising $N_3' < N_3$ basis vectors is selected/reported, wherein the InS is common for all layers.

In step 2, for each layer $l \in \{0, 1, \ldots, v-1\}$ of a rank v CSI reporting, M FD basis vectors are selected/reported freely (independently) from $N_3'$ basis vectors in the InS.

In one example, one-step method is used when $N_3 < 19$ and two-step method is used when $N_3 > 19$. In one example, $M = \lceil \alpha M \rceil$ where $\alpha > 1$ is either fixed (to 2 for example) or configurable.

The codebook parameters used in the DFT based frequency domain compression (eq. 5) are (L, $p_v$ for $v \in \{1, 2\}$, $p_v$ for $v \in \{3, 4\}$, $\beta$, $\alpha$, $N_{ph}$). In one example, the set of values for these codebook parameters are as follows.

L: the set of values is {2, 4} in general, except $L \in \{2, 4, 6\}$ for rank 1-2, 32 CSI-RS antenna ports, and R=1.

($p_v$ for $v \in \{1, 2\}$, $p_v$ for $$v \in \{3, 4\}) \in \left\{\left(\frac{1}{2}, \frac{1}{4}\right), \left(\frac{1}{4}, \frac{1}{4}\right), \left(\frac{1}{4}, \frac{1}{8}\right)\right\}.$$

$$\beta \in \left\{\frac{1}{4}, \frac{1}{2}, \frac{3}{4}\right\}.$$

$\alpha \in \{1.5, 2, 2.5, 3\}$ $N_{ph} \in \{8, 16\}$.

In another example, the set of values for these codebook parameters are as follows: $\alpha=2$, $N_{ph}=16$, and as in Table 1, where the values of L, $\beta$ and $p_v$ are determined by the higher layer parameter paramCombination-r17. In one example, the UE is not expected to be configured with paramCombination-r17 equal to −3, 4, 5, 6, 7, or 8 when $P_{CSI-RS}=4$,
  7 or 8 when number of CSI-RS ports $P_{CSI-RS}<32$,
  7 or 8 when higher layer parameter typeII-RI-Restriction-r17 is configured with $r_i=1$ for any i>1,
  7 or 8 when R=2.

The bitmap parameter typeII-RI-Restriction-r17 forms the bit sequence $r_3, r_2, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with v=i+1 layers. The parameter R is configured with the higher-layer parameter numberOfPMISubbandsPerCQISubband-r17. This parameter controls the total number of precoding matrices $N_3$ indicated by the PMI as a function of the number of subbands in csi-ReportingBand, the subband size configured by the higher-level parameter subbandSize and of the total number of PRBs in the bandwidth part.

TABLE 1

| paramCom-bina-tion-r17 | L | $p_v$ $v \in \{1, 2\}$ | $p_v$ $v \in \{3, 4\}$ | $\beta$ |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

The above-mentioned framework (equation 5) represents the precoding-matrices for multiple ($N_3$) FD units using a linear combination (double sum) over 2L SD beams and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H, \qquad \text{(equation 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of disclosure is applicable to both space-frequency (equation 5) and space-time (equation 5A) frameworks.

In general, for layer l=1, . . . , v, where v is the rank value reported via RI, the pre-coder (cf. equation 5 and equation 5A) includes some of or all of the codebook components summarized in Table 2.

TABLE 2

| | Codebook components | |
| --- | --- | --- |
| Index | Components | Description |
| 0 | L | number of SD beams |
| 1 | $M_v$ | number of FD/TD beams |
| 2 | $\{a_i\}_{i=0}^{L-1}$ | set of SD beams comprising columns of $A_l$ |
| 3 | $\{b_{l,f}\}_{f=0}^{M_v-1}$ | set of FD/TD beams comprising columns of $B_l$ |
| 4 | $\{x_{l,i,f}\}$ | bitmap indicating the indices of the non-zero (NZ) coefficients |
| 5 | $SCI_l$ | Strongest coefficient indicator for layer l |
| 6 | $\{p_{l,i,f}\}$ | amplitudes of NZ coefficients indicated via the bitmap |
| 7 | $\{\phi_{l,i,f}\}$ | phases of NZ coefficients indicated via the bitmap |

Let $P_{CSIRS,SD}$ and $P_{CSIRS,FD}$ be number of CSI-RS ports in SD and FD, respectively. The total number of CSI-RS ports is $P_{CSIRS,SD} \times P_{CSIRS,FD} = P_{CSIRS}$. Each CSI-RS port can be beam-formed/pre-coded using a pre-coding/beam-forming vector in SD or FD or both SD and FD. The pre-coding/beam-forming vector for each CSI-RS port can be derived based on UL channel estimation via SRS, assuming (partial) reciprocity between DL and UL channels. Since CSI-RS ports can be beam-formed in SD as well as FD, the Rel. 15/16 Type II port selection codebook can be extended to perform port selection in both SD and FD followed by linear combination of the selected ports. In the rest of the disclosure, some details pertaining to the port selection codebook for this extension are provided.

In the rest of disclosure, the terms 'beam' and 'port' are used interchangeably and they refer to the same component of the codebook. For brevity, beam/port or port/beam is used in this disclosure.

In one embodiment A.1, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}$=Q. In another example, $P_{CSIRS} \geq Q$. Here, $Q = P_{CSIRS,SD} \times P_{CSIRS,FD}$. The CSI-RS ports can be beamformed in SD and/or FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit t∈{0, 1, . . . , $N_3-1$} (together with the beamforming used to beamformed CSI-RS). In one example, $P_{CSIRS,SD}$∈{4, 8, 12, 16, 32} or {2, 4, 8, 12, 16, 32}. In one example, $P_{CSIRS,SD}$ and $P_{CSIRS,FD}$ are such that their product $Q = P_{CSIRS,SD} \times P_{CSIRS,FD}$∈{4, 8, 12, 16, 32} or {2, 4, 8, 12, 16, 32}.

Figure 12:
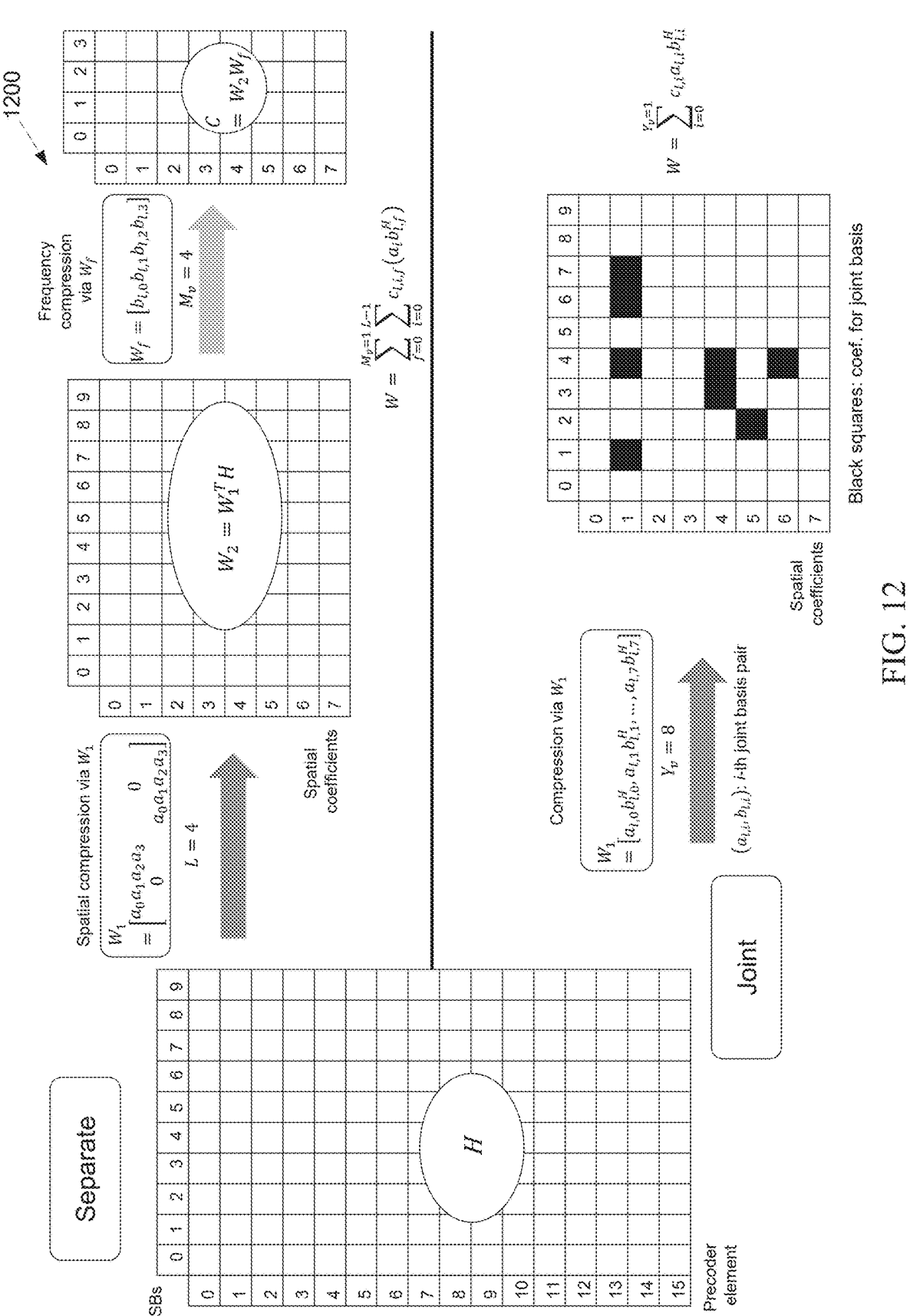
FIG. 12 illustrates an example of a port selection codebook that facilitates independent (separate) port selection across SD and FD, and that also facilitates joint port selection across SD and FD according to embodiments of the present disclosure.

FIG. 12 illustrates an example of a new port selection codebook that facilitates independent (separate) port selection across SD and FD, and that also facilitates joint port selection across SD and FD 1400 according to embodiments of the disclosure. The embodiment of a new port selection codebook that facilitates independent (separate) port selection across SD and FD, and that also facilitates joint port selection across SD and FD 1200 illustrated in FIG. 12 is for illustration only. FIG. 12 does not limit the scope of this disclosure to any particular implementation of the example of a new port selection codebook that facilitates independent (separate) port selection across SD and FD, and that also facilitates joint port selection across SD and FD 1200.

The new port selection codebook facilitates independent (separate) port selection across SD and FD. This is illustrated in the top part of FIG. 12.

For layer l=1, . . . , v, where v is the rank value reported via RI, the pre-coder (cf. equation 5 and equation 5A) includes the codebook components (indicated via PMI) summarized in Table 3. The parameters L and $M_1$ are either fixed or configured (e.g., via RRC).

TABLE 3

| | Codebook components | |
| --- | --- | --- |
| Index | Components | Description |
| 0 | $\{a_i\}_{i=0}^{L-1}$ | set of SD beams/ports comprising columns of $A_l$ |
| 1 | $\{b_{l,f}\}_{f=0}^{M_v-1}$ | set of FD/TD beams/ports comprising columns of $B_l$ |
| 2 | $\{x_{l,i,f}\}$ | bitmap indicating the indices of the non-zero (NZ) coefficients |
| 3 | $SCI_l$ | an indicator indicating an index $(i_l^*, f_l^*)$ of the strongest coefficient for layer l |
| 4 | $P_{l,r}^{(1)}$ | reference amplitude |
| 5 | $\{p_{l,i,f}\}$ | amplitudes of NZ coefficients indicated via the bitmap |
| 6 | $\{\phi_{l,i,f}\}$ | phases of NZ coefficients indicated via the bitmap |

In one embodiment A.2, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}$=Q. In another example, $P_{CSIRS} \geq Q$. Here, $Q = P_{CSIRS,SD} \times P_{CSIRS,FD}$. The CSI-RS ports can be beamformed in SD and/or FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit t∈{0, 1, . . . , $N_3-1$} (together with the beamforming used to beamformed CSI-RS). In one example, $P_{CSIRS,SD}$∈{4, 8, 12, 16, 32} or {2, 4, 8, 12, 16, 32}. In one example, $P_{CSIRS,SD}$ and $P_{CSIRS,FD}$ are such that their product $Q = P_{CSIRS,SD} \times P_{CSIRS,FD}$∈{4, 8, 12, 16, 32} or {2, 4, 8, 12, 16, 32}.

The new port selection codebook facilitates joint port selection across SD and FD. This is illustrated in the bottom part of FIG. 12. The codebook structure is similar to Rel. 15 NR Type II codebook comprising two main components.

$W_1$: to select $Y_v$ out of $P_{CSI-RS}$ SD-FD port pairs jointly

In one example, $Y_v \leq P_{CSI-RS}$ (if the port selection is independent across two polarizations or two groups of antennas with different polarizations)

In one example, $$Y_v \leq \frac{P_{CSI-RS}}{2}$$

(if the port selection is common across two polarizations or two groups of antennas with different polarizations)

$W_2$: to select coefficients for the selected $Y_v$ SD-FD port pairs.

In one example, the joint port selection (and its reporting) is common across multiple layers (when v>1). In one example, the joint port selection (and its reporting) is independent across multiple layers (when v>1). The reporting of the selected coefficients is independent across multiple layers (when v>1).

For layer l=1, . . . , v, where v is the rank value reported via RI, the pre-coder (cf. equation 5 and equation 5A) includes the codebook components (indicated via PMI) summarized in Table 4. The parameter $Y_v$ is either fixed or configured (e.g., via RRC).

TABLE 4

Codebook components

| Index | Components | Description |
|---|---|---|
| 0 | $\{(a_{l,i}, b_{l,i})\}_{i=0}^{Y_v-1}$ | set of selected (SD, FD/TD) beams/port pairs comprising columns of $A_l$ and $B_l$ |
| 1 | $\{x_{l,i}\}$ | bitmap indicating the indices of the non-zero (NZ) coefficients |
| 2 | $SCI_l$ | an indicator indicating an index $i_l$*of the strongest coefficient for layer l |
| 3 | $P_{l,r}^{(1)}$ | reference amplitude |
| 4 | $\{p_{l,i}\}$ | amplitudes of NZ coefficients indicated via the bitmap |
| 5 | $\{\phi_{l,i}\}$ | phases of NZ coefficients indicated via the bitmap |

In one embodiment I, a UE is configured with higher layer parameter codebookType set to 'typeII-PortSelection-r17' for CSI reporting based on a new (Rel. 17) Type II port selection codebook (as described in embodiment A.1 and A.2). The UE further configured to report a CSI including CQI and/or PMI, where the PMI indicates a pre-coder or a pre-coding matrix (determined using the configured codebook). The frequency granularity of one or both of CQI and PMI reporting can be configured to be subband (SB), i.e., one CQI and/or one PMI is/are reported for each SB in the CSI reporting band configured for CSI reporting. In one example, a SB is defined as $N_{PRB}^{SB}$ contiguous PRBs. The details about this per SB CQI and/or PMI reporting is according to at least one of the following examples.

In one example I.1, the SB size ($N_{PRB}^{SB}$) in PRBs for CQI and PMI reporting is the same. In one example, the SB size (in PRBs) is configured. This configuration can be via a higher layer signaling. The UE can be configured (e.g., via higher layer signaling) with one out of multiple possible SB sizes as shown in Table 5 or Table 6, depending on the total number of PRBs in the bandwidth part (BWP) comprising the CSI reporting band. The value of (v1, v2, v3, v4) can be (8, 16, 32, 64) or (16, 32, 64, 128) or (24, 72, 144, 275) or $(N_{1,PRB}^{CSI}, N_{2,PRB}^{CSI}, N_{3,PRB}^{CSI}, N_{4,PRB}^{CSI})$, where $N_{1,PRB}^{CSI}$, $N_{2,PRB}^{CSI}$, $N_{3,PRB}^{CSI}$, and $N_{4,PRB}^{CSI}$ are the number of PRBs in the CSI reporting bands configured in BWP ranges <24, 24-72, 73-144, 145-275, respectively. Note that the last two example values (24, 72, 144, 275) or $(N_{1,PRB}^{CSI}, N_{2,PRB}^{CSI}, N_{3,PRB}^{CSI}, N_{4,PRB}^{CSI})$ corresponds to a single SB, which is the entire CSI reporting band, hence the reporting of CQI and/or PMI corresponds to WB in this extreme case.

TABLE 5

Configurable subband sizes

| Bandwidth part (PRBs) | Subband size (PRBs) |
|---|---|
| 24-72 | 4, 8, v2 |
| 73-144 | 8, 16, v3 |
| 145-275 | 16, 32, v4 |

TABLE 6

Configurable subband sizes

| Bandwidth part (PRBs) | Subband size (PRBs) |
|---|---|
| <24 | 2, 4, v1 |
| 24-72 | 4, 8, v2 |
| 73-144 | 8, 16, v3 |
| 145-275 | 16, 32, v3 |

In one example, the largest SB size for each BWP range (rows in the tables) can be configured only when the higher layer parameter codebookType set to 'typeII-PortSelection-r17'. For example, for BRP range within 24-72 PRBs, the SB size=v2 can only be configured when the higher layer parameter codebookType set to 'typeII-PortSelection-r17'.

In one example, there is no restriction (or limitation) regarding the configuration of the largest SB size.

In one example, the support of the largest value (v1, v2, v3, v4) is subject to the UE capability, i.e., it can be configured only when the UE reports in its capability signaling that it is capable of supporting the largest value(s).

In one example, more than one values for (v1, v2, v3, v4) are supported, for example, two out of (8, 16, 32, 64), (16, 32, 64, 128), (24, 72, 144, 275), and $(N_{1,PRB}^{CSI}, N_{2,PRB}^{CSI}, N_{3,PRB}^{CSI}, N_{4,PRB}^{CSI})$ are supported. The UE can be configured with one of the two supported values via higher layer signaling, which can be subject to UE capability reporting.

In one example I.2, the SB size ($N_{PRB}^{SB}$) in PRBs for CQI is the same as in Rel. 15 NR, i.e., according to Section 5.2.1.4 of [REF8], shown in Table 7 and Table 8. The SB size for PMI can be equal to or smaller than that for CQI.

TABLE 7

Configurable subband sizes

| Bandwidth part (PRBs) | Subband size (PRBs) |
|---|---|
| 24-72 | 4, 8 |
| 73-144 | 8, 16 |
| 145-275 | 16, 32 |

TABLE 8

| Configurable subband sizes | |
| --- | --- |
| Bandwidth part (PRBs) | Subband size (PRBs) |
| <24 | 2, 4 |
| 24-72 | 4, 8 |
| 73-144 | 8, 16 |
| 145-275 | 16, 32 |

At least one of the following examples is used/configured.

In one example I.2.1: The SB size for CQI is configured according to Section 5.2.1.4 of [REF8], shown in Table 7 and Table 8. The SB size for PMI is fixed according to at least one of the following examples.

In one example I.2.1.1: The SB size for PMI is fixed to 1 or ½ of SB size for CQI or 1/r of SB size for CQI, where r is an integer. In an example, r=2. In another example, r=4.

In one example I.2.1.2: The SB size for PMI is fixed to a value A regardless of the configured BW or bandwidth part or SB size of CQI. In one example, A=1. In another example, A=2. In another example, A=4.

In one example I.2.1.3: The SB size for PMI is fixed to a value A1 if the configured BW (or BW part) is less or equal to a fixed value B, and a value A2<A1 if the configured BW (or BW part) is greater than the fixed value B. In one example, (A1, A2)=(x, 1). In another example, (A1, A2)=(x, 2). In another example, (A1, A2)=(x, 4). Here, x is SB size for CQI for the configured BW (or BW part). In one example, B=72 PRBs. In another example, B=144 PRBs.

In one example I.2.1.4: The SB size for PMI is fixed to a value A1 if the configured SB size for CQI (x) is less or equal to a fixed value B, and a value A2<A1 if the configured SB size for CQI (x) is greater than the fixed value B. In one example, (A1, A2)=(x, 1). In another example, (A1, A2)=(x, 2). In another example, (A1, A2)=(x, 4). In one example, B=4. In another example, B=8.

In one example I.2.2: The SB size for both CQI and PMI can be configured. For example, the SB size for CQI is according to Section 5.2.1.4 of [REFS], shown in Table 7 and Table 8. The SB size for PMI can be configured according to at least one of the following examples.

In one example I.2.2.1: The SB size for PMI is configured from {1, 2, . . . , SB size for CQI} or from {1/R of SB size for CQI, where R=is an integer}. In one example, the SB size for PMI is configured from {2, 4} or {1, 2} or {1, 4}. In another example, the SB size for PMI is parameterized using a parameter R as $$\frac{x}{R},$$

where x is the SB size for CQI, and the parameter R is configured from {2, 4} or {1, 4} or {1, 2}.

In one example I.2.2.2: The SB size for PMI is fixed if the configured BW (or BW part) is less or equal to a fixed value B, and the SB size for PMI is configured if the configured BW (or BW part) is greater than the fixed value B. If the SB size of PMI is fixed, then it is according to at least one examples in Example I.2.1.3. If the SB size of PMI is configured, then it is according to at least one examples in Example I.2.2.1. In one example, B=72 PRBs. In another example, B=144 PRBs.

In one example I.2.2.3: The SB size for PMI is fixed if the configured SB size for CQI (x) is less or equal to a fixed value B, and the SB size for PMI is configured if the configured SB size for CQI (x) is greater than the fixed value B. If the SB size of PMI is fixed, then it is according to at least one of the examples in Example I.2.1.4. If the SB size of PMI is configured, then it is according to at least one of the examples in Example I.2.2.1. In one example, B=4. In another example, B=8.

In Example I.2.2.1, the parameter R can be configured with the higher-layer parameter numberOfPMISubbandsPerCQISubband. This parameter controls the total number of precoding matrices $N_3$ indicated by the PMI as a function of the number of configured subbands in csi-ReportingBand, the subband size configured by the higher-level parameter subbandSize and of the total number of PRBs in the bandwidth part according to Table 5.2.1.4-2 [REFS], as follows:

When R=1:

One precoding matrix is indicated by the PMI for each subband in csi-ReportingBand.

When R=2:

For each subband in csi-ReportingBand that is not the first or last subband of a BWP, two precoding matrices are indicated by the PMI: the first precoding matrix corresponds to the first $N_{PRB}{}^{SB}/2$ PRBs of the subband and the second precoding matrix corresponds to the last $N_{PRB}{}^{SB}/2$ PRBs of the subband.

For each subband in csi-ReportingBand that is the first or last subband of a BWP If $$\left(N_{BWP,i}^{start} \bmod N_{PRB}^{SB}\right) \ge \frac{N_{PRB}^{SB}}{2},$$

one precoding matrix is indicated by the PMI corresponding to the first subband. If $$\left(N_{BWP,i}^{start} \bmod N_{PRB}^{SB}\right) < \frac{N_{PRB}^{SB}}{2},$$

two precoding matrices are indicated by the PMI corresponding to the first subband: the first precoding matrix corresponds to the first $$\frac{N_{PRB}^{SB}}{2} - \left(N_{BWP,i}^{start} \bmod N_{PRB}^{SB}\right)$$

PRBs of the first subband and the second precoding matrix corresponds to the last $$\frac{N_{PRB}^{SB}}{2}$$

PRBs of the first subband.

If $$1 + \left(N_{BWP,i}^{start} + N_{BWP,i}^{size} - 1\right) \bmod N_{PRB}^{SB} \le \frac{N_{PRB}^{SB}}{2},$$

one precoding matrix is indicated by the PMI corresponding to the last subband. If $$1 + \left(N_{BWP,i}^{start} + N_{BWP,i}^{size} - 1\right) \bmod \; N_{PRB}^{SB} > \frac{N_{PRB}^{SB}}{2},$$

two precoding matrices are indicated by the PMI corresponding to the last subband: the first precoding matrix corresponds to the first $$\frac{N_{PRB}^{SB}}{2}$$

PRBs of the last subband and the second precoding matrix corresponds to the last $$1 + \left(N_{BWP,i}^{start} + N_{BWP,i}^{size} - 1\right) \bmod \; N_{PRB}^{SB} - \frac{N_{PRB}^{SB}}{2}$$

PRBs of the last subband.

In one example I.3, the SB size ($N_{PRB}^{SB}$) in PRBs for CQI and PMI can be different. In particular, the SB size for PMI can be equal to or larger than that for CQI. At least one of the following sub-alternatives is used.

In one example I.3.1: The SB size for PMI is configured according to Section 5.2.1.4 of [REF8], shown in Table 7 and Table 8. The SB size for CQI is fixed, for example, to 1 or ½ of SB size for PMI or 1/r of SB size for PMI, where r is an integer.

In one example I.3.2: The SB size for CQI is configured according to Section 5.2.1.4 of [REF8], shown in Table 7 and Table 8. The SB size for PMI is fixed, for example, to 1 or 2 times of SB size for PMI or r times of SB size for PMI, where r is an integer.

In one example I.3.3: the SB size for CQI is according to Section 5.2.1.4 of [REF8], shown in Table 7 and Table 8. The SB size for PMI is configured from {1, 2, . . . ,} times SB size for CQI or from {R×SB size for CQI, where R is an integer}. In one example, the SB size for PMI is parameterized using a parameter R as $$\frac{x}{R},$$

where x is the SB size for CQI, and the parameter R is configured from {0.25, 0.5} or {0.5, 1} or {0.25, 1} or {0.25, 0.5, 1} or {$N_{PRB}^{SB}/N_{BWP,i}^{size}$, 0.5, 1}. In one example, the SB size for PMI is parameterized using a parameter R as x×Q, where x is the SB size for CQI, and the parameter R is configured from {1, 2} or {2, 4} or {1, 4} or {1, 2, 4}.

Figure 13:
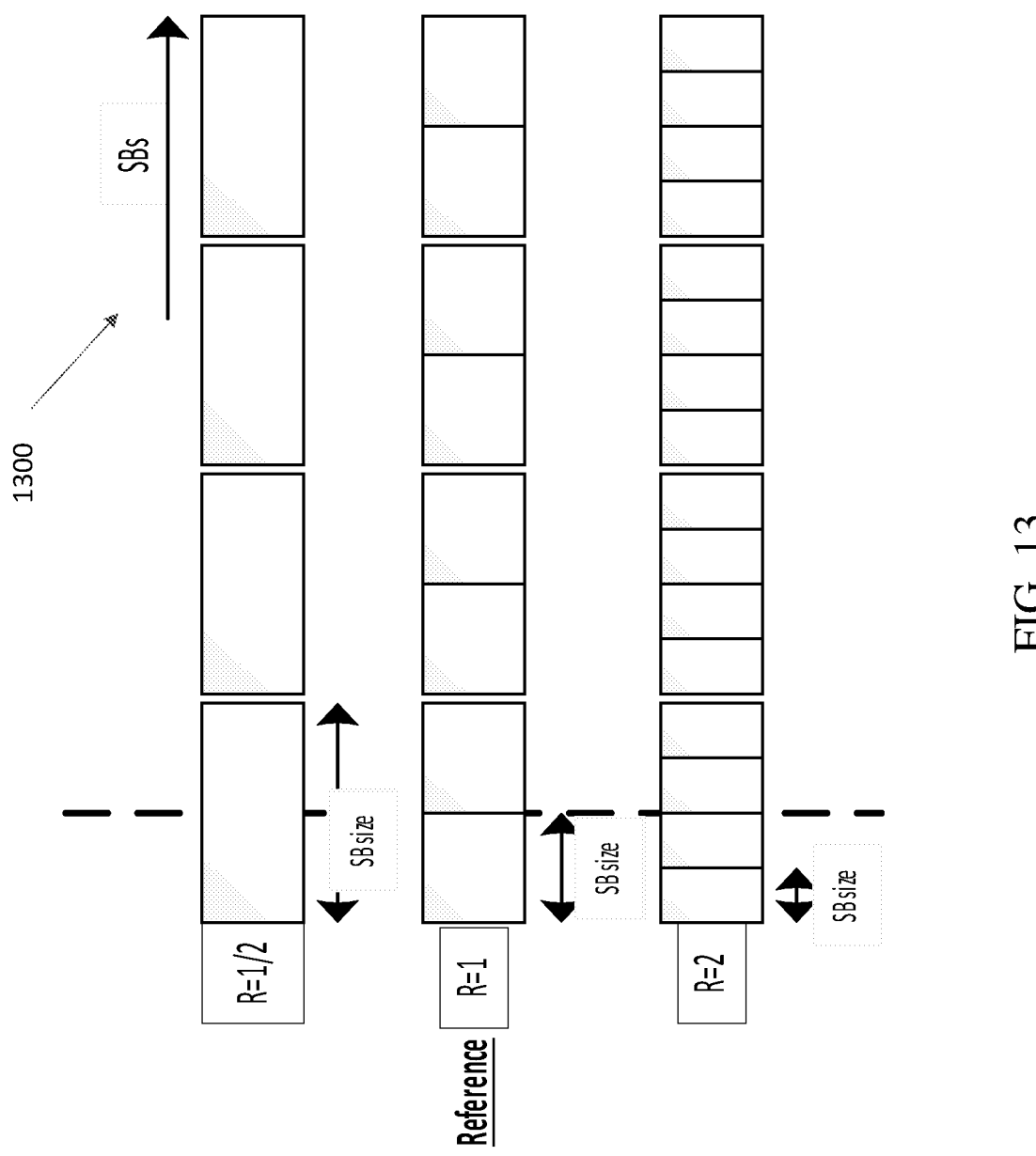
FIG. 13 illustrates SB sizes depending on the value of R according to embodiments of the present disclosure.

FIG. 13 illustrates an example of SB sizes 1300 according to embodiments of the disclosure. The embodiment of SB sizes 1300 illustrated in FIG. 13 is for illustration only. FIG. 13 does not limit the scope of this disclosure to any particular implementation of the example SB sizes 1300.

In one example I.4, the SB size ($N_{PRB}^{SB}$) in PRBs for CQI and PMI can be different. In particular, the SB size for PMI can be smaller than or equal to or larger than that for CQI. When the SB size for PMI can be smaller than or equal to that for CQI, at least one of the examples I.2.1 through I.2.2 can be used. When the SB size for PMI can be equal to or larger than that for CQI, at least one of the examples I.3.1 through I.3.3 can be used. In particular, the parameter R can be configured via higher layer signaling which can take a value $r_1 < 1$ or a value $r_2 = 1$ or a value $r_3 > 1$, and depending of the value of $r_1$ or $r_2$ or $r_3$, the CQI and PMI SB sizes are determined as described in this disclosure. In one example, the parameter R can take a value from a set that includes values {½, 1, 2} or {½, 1, 2, $N_{PRB}^{SB}$} or {½, 1, $N_{PRB}^{SB}$} or {$N_{PRB}^{SB}/N_{BWP,i}^{size}$, 1, 2, $N_{PRB}^{SB}$} or {$N_{PRB}^{SB}/N_{BWP,i}^{size}$, 1, $N_{PRB}^{SB}$} or {$N_{PRB}^{SB}/N_{BWP,i}^{size}$, $N_{PRB}^{SB}$}, where $N_{BWP,i}^{size}$ is the size of BWP (or CSI reporting band). Note that $R=N_{PRB}^{SB}/N_{BWP,i}^{size}$ corresponding to a SB size that covers the entire BWP (or CSI reporting band). An illustration of SB sizes is shown in FIG. 13, where R=1 is considered a reference SB size. When R=2, 2 SBs can be contained (accommodated) in each reference SB size. Likewise, when R=½, only ½ of a SB can be contained (accommodated) in each reference SB size.

In one example I.5, the SB size for CQI and PMI reporting is the same if SB size for CQI is less or equal to a fixed value y (i.e., x≤y) and the SB size of PMI reporting is less than that for CQI reporting if SB size for CQI is larger than a fixed value y (i.e., x>y). In example, the fixed value y=4 or 8. If the SB size of PMI is less than that for CQI, then the SB size for PMI is determined according to at least one of example I.2.1 through I.2.2.

In one example I.6, the SB size for CQI and PMI reporting is the same if SB size for CQI is less than a fixed value y (i.e., x<y) and the SB size of PMI reporting is less than that for CQI reporting if SB size for CQI is larger or equal to a fixed value y (i.e., x≤y). In one example, the fixed value y=4 or 8. If the SB size of PMI is less than that for CQI, then the SB size for PMI is determined according to at least one of example I.2.1 through I.2.2.

In one example I.7, when the SB size is configured according to example I.1, and the largest SB size (v1, v2, v3, v4), shown in Table 5 and Table 6, is configured, then the value of R (indicating the max number of PMI SBs per CQI SBs) can be restricted to be only R=1. For SB sizes other than (v1, v2, v3, v4), the value of R is not restricted, i.e., R=1 as well as R≠1 (assuming the UE is capable to support it) can be configured.

In one example I.8, when the SB size is configured according to example I.2, the value of R (indicating the max number of PMI SB s per CQI SBs) can be restricted to be R=1. Or, the value of R is not restricted, i.e., R=1 as well as R>1, e.g., R=2 or NM (assuming the UE is capable to support it) can be configured.

In one example I.9, when the SB size is configured according to example I.3, the value of R (indicating the max number of PMI SB s per CQI SB s) can be restricted to be R=1. Or, the value of R is not restricted, i.e., R=1 as well as R<1, e.g., R=½ or $N_{PRB}^{SB}/N_{BWP,i}^{size}$ (assuming the UE is capable to support it) can be configured.

In one example I.10, when the SB size is configured according to example I.4, the value of R (indicating the max number of PMI SB s per CQI SB s) can be restricted to be R=1. Or, the value of R is not restricted, i.e., R=1 or R<1, e.g., R=½ or $N_{PRB}^{SB}/N_{BWP,i}^{size}$ (assuming the UE is capable to support it) or >1, e.g., R=2 or $N_{PRB}^{SB}$ (assuming the UE is capable to support it) can be configured.

In one embodiment II.1, the SB size for PMI and/or CQI reporting is determined and reported by the UE. This reporting can be explicit via two parameters, one for CQI SB size and another for PMI SB size. Or, this reporting can be implicit, e.g., via one parameter. In one example of implicit reporting, the parameter R is reported by the UE, where the description of the parameter R is according to some examples in this disclosure. At least one of the following examples is used/configured for the reporting.

In one example II.1.1, this reporting (e.g., of the parameter R) can be configured as part of a CSI reporting. The CSI reporting can be dedicated for this purpose (i.e., not multiplexed with other CSI parameters such as PMI, RI, CQI, LI). Optionally, the CSI reporting can include an indication for the SB size for PMI and/or CQI that is multiplexed with the indications for other CSI parameters such as PMI, RI, CQI, LI.

In one example II.1.2, this reporting (e.g., of the parameter R) is via the UE capability reporting about R.

In one example II.1.3, this reporting (e.g., of the parameter R) can be configured as part of a CSI reporting, where the configuration is subject to the UE capability reporting about R.

In one embodiment II.2, the UE is configured with a dynamic indication of SB size for PMI and/or CQI. This indication can be explicit via two parameters, one for CQI SB size and another for PMI SB size. Or, this indication can be implicit, e.g., via one parameter. In one example of implicit indication, the parameter R is indication to the UE, where the description of the parameter R is according to some examples in this disclosure. At least one of the following examples is used/configured for the indication.

In one example II.2.1, this indication is via DCI. For example, a DCI field (or code point) can be used to indicate the SB size for PMI and/or CQI from a set of supported values (which can be fixed or configured via RRC).

In one example II.2.2, this indication is via MAC CE. For example, a MAC CE activation command can be used to indicate the SB size for PMI and/or CQI from a set of supported values (which can be fixed or configured via RRC).

In one example II.2.3, this indication is via a combination of MAC CE and DCI. For example, a MAC CE activation command can be used to indicate a subset of candidate values from a set of supported values (which can be fixed or configured via RRC), and a DCI field (or code point) can be used to indicate the SB size for PMI and/or CQI from the subset indicated via MAC CE.

In one embodiment II.3, the feature regarding the SB size of CQI and/or PMI as described in this disclosure can be turned ON or configured or enabled via signaling (higher layer configuration), either separately via a dedicated parameter or jointly via a joint parameter. This signaling can be subject to (or conditioned upon) the UE capability reporting (if reported).

In one embodiment II.4, the feature regarding the SB size of CQI and/or PMI as described in this disclosure is subject to a certain condition. In one example, the condition corresponds to the codebook component $W_f$ for FD compression being turned OFF (when turned OFF, $W_f$ can be fixed, e.g., to an all-one vector, and in one example, $W_f$ OFF is configured via $M_v=1$, where $M_v$ indicates the number of column vectors $W_f$ comprising the FD basis vectors). In one example, the condition corresponds to the codebook component $W_f$ for FD compression being turned ON (when turned ON, $W_f$ is $N_3 \times M_v$, and in one example, $W_f$ ON is configured via $M_v>1$, e.g., $M_v=2$, where $M_v$ indicates the number of column vectors $W_f$ comprising the FD basis vectors).

At least one of the following examples is used/configured.

In one example II.4.1, the largest SB size (v1, v2, v3, v4) as described in example I.1 can be only configured when the condition is satisfied.

In one example II.4.2, the value of R (indicating the max number of PMI SBs per CQI SBs) greater than 1 (e.g., R=2 or 4 or $D \times N_{PRB}{}^{SB}$) as described in example I.2 can be only be configured when the condition is satisfied.

In one example II.4.3, the value of R (indicating the max number of PMI SBs per CQI SBs) smaller than 1 (e.g., R=½ or ¼) as described in example I.3 can be only be configured when the condition is satisfied.

In one example II.4.4, the value of R (indicating the max number of PMI SBs per CQI SBs) greater than 1 (e.g., R=2 or 4 or $D \times N_{PRB}{}^{SB}$) or smaller than 1 (e.g., R=½ or ¼) as described in example I.4 can be only be configured when the condition is satisfied.

Here D is the density of CSI-RS resource in frequency domain and $N_{PRB}{}^{SB}$ is the subband size in terms of number of PRBs.

In one embodiment II.5, which is a special case of example II.4.2 of embodiment II.4, wherein the supported values of R are {1, x} where x>1. In one example, x=2. In one example, $x=D \times N_{PRB}{}^{SB}$. The value R=1 is mandatory for a UE supporting the codebook described in this disclosure. However, the value R=x is optional for a UE, i.e., a UE can report whether it supports the value R=x (e.g., via UE capability reporting either via a separate capability or as part of another capability, e.g., together with the capability reporting for the support of $M_v=2$), and only for the UE reports the support for R=x, the UE can be configured with a value of R from {1, x}, otherwise, the value is fixed to R=1.

In addition, the value of R=x can configured subject to a condition, where the condition is based on the value of $M_v$ or whether $W_f$ is turned OFF ($M_v=1$) or ON ($M_v=2$). In particular, when $W_f$ being turned OFF ($M_v=1$) is configured, then only R=1 can be used/configured, i.e., R=x can't be configured in this case. And $W_f$ being turned ON ($M_v=2$) is configured, then either R=1 or x can be used/configured, i.e., R=x can be configured in this case. In other words, the value R=1 can be used/configured regardless of the $M_v$ value, but the value R=x can be configured only when $M_v=2$ is configured.

Note that R=1 implies that $N_3=N_{SB}$, the number of SBs configured for CSI reporting (implying that the SB sizes and number of SBs for both PMI and CQI reporting/calculation are the same), and R=x implies that $N_3=R \times N_{SB}$ which is the number of FD units/components for precoding matrix reporting/calculation indicated via the PMI (implying that the SB sizes and number of SBs for both PMI and CQI reporting/calculation are different).

When R=1: one precoding matrix is indicated by the PMI for each subband in csi-ReportingBand.

When R=x:

For each subband in csi-ReportingBand that is not the first or last subband of a BWP, R=x precoding matrices are indicated by the PMI: the first precoding matrix corresponds to the first $N_{PRB}{}^{SB}/x$ PRBs of the subband, the second precoding matrix corresponds to the second $N_{PRB}{}^{SB}/x$ PRBs of the subband, . . . and the x-th precoding matrix corresponds to the last $N_{PRB}{}^{SB}/x$ PRBs of the subband.

When R=2, for each subband in csi-ReportingBand that is the first or last subband of a BWP, If $$\left(N_{BWP,i}^{start} \bmod N_{PRB}^{SB}\right) \geq \frac{N_{PRB}^{SB}}{2},$$

33 one precoding matrix is indicated by the PMI corresponding to the first subband. If $$\left(N_{BWP,i}^{start} \bmod N_{PRB}^{SB}\right) < \frac{N_{PRB}^{SB}}{2},$$

two precoding matrices are indicated by the PMI corresponding to the first subband: the first precoding matrix corresponds to the first $$\frac{N_{PRB}^{SB}}{2} - \left(N_{BWP,i}^{start} \bmod N_{PRB}^{SB}\right)$$

PRBs of the first subband and the second precoding matrix corresponds to the last $$\frac{N_{PRB}^{SB}}{2}$$

PRBs of the first subband.
If $$1 + \left(N_{BWP,i}^{start} + N_{BWP,i}^{size} - 1\right) \bmod N_{PRB}^{SB} \le \frac{N_{PRB}^{SB}}{2},$$

one precoding matrix is indicated by the PMI corresponding to the last subband. If $$1 + \left(N_{BWP,i}^{start} + N_{BWP,i}^{size} - 1\right) \bmod N_{PRB}^{SB} > \frac{N_{PRB}^{SB}}{2},$$

two precoding matrices are indicated by the PMI corresponding to the last subband: the first precoding matrix corresponds to the first $$\frac{N_{PRB}^{SB}}{2}$$

PRBs of the last subband and the second precoding matrix corresponds to the last $$1 + \left(N_{BWP,i}^{start} + N_{BWP,i}^{size} - 1\right) \bmod N_{PRB}^{SB} - \frac{N_{PRB}^{SB}}{2}$$

PRBs of the last subband.
When R=x, for each subband in csi-ReportingBand that is the first or last subband of a BWP,
If $$\left(N_{BWP,i}^{start} \bmod N_{PRB}^{SB}\right) \ge (x-1)\frac{N_{PRB}^{SB}}{x},$$

one precoding matrix is indicated by the PMI corresponding to the first subband. If

34

$$(x-2)\frac{N_{PRB}^{SB}}{x} \le \left(N_{BWP,i}^{start} \bmod N_{PRB}^{SB}\right) < (x-1)\frac{N_{PRB}^{SB}}{x},$$

two precoding matrices are indicated by the PMI corresponding to the first subband: the first precoding matrix corresponds to the first $$(x-1)\frac{N_{PRB}^{SB}}{x} - \left(N_{BWP,i}^{start} \bmod N_{PRB}^{SB}\right)$$

PRBs of the first subband and the second precoding matrix corresponds to the last $$\frac{N_{PRB}^{SB}}{x}$$

PRBs of the first subband. In general, if $$(x-p)\frac{N_{PRB}^{SB}}{x} \le \left(N_{BWP,i}^{start} \bmod N_{PRB}^{SB}\right) < (x-p+1)\frac{N_{PRB}^{SB}}{x},$$

p precoding matrices are indicated by the PMI corresponding to the first subband, where p∈{1, . . . , x}.
If $$1 + \left(N_{BWP,i}^{start} + N_{BWP,i}^{size} - 1\right) \bmod N_{PRB}^{SB} \le \frac{N_{PRB}^{SB}}{x},$$

one precoding matrix is indicated by the PMI corresponding to the last subband. If $$2 \times \frac{N_{PRB}^{SB}}{x} \ge 1 + \left(N_{BWP,i}^{start} + N_{BWP,i}^{size} - 1\right) \bmod N_{PRB}^{SB} > \frac{N_{PRB}^{SB}}{x},$$

two precoding matrices are indicated by the PMI corresponding to the last subband: the first precoding matrix corresponds to the first $$\frac{N_{PRB}^{SB}}{x}$$

PRBs of the last subband and the second precoding matrix corresponds to the last $$1 + \left(N_{BWP,i}^{start} + N_{BWP,i}^{size} - 1\right) \bmod N_{PRB}^{SB} - \frac{N_{PRB}^{SB}}{x}$$

PRBs of the last subband. In general, if $$p\frac{N_{PRB}^{SB}}{x} \ge 1 + \left(N_{BWP,i}^{start} + N_{BWP,i}^{size} - 1\right) \bmod N_{PRB}^{SB} > (p-1)\frac{N_{PRB}^{SB}}{x},$$

tp precoding matrices are indicated by the PMI corresponding to the last subband, where p∈{1, . . . , x}.

Any of the above variation embodiments can be utilized independently or in combination with at least one other variation embodiment.

FIG. 14 illustrates a flow chart of a method 1400 for operating a UE, as may be performed by a UE such as UE 116, according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 begins at step 1402. In step 1402, the UE (e.g., 111-116 as illustrated in FIG. 1) receives configuration information about a channel state information (CSI) report, the configuration information including information about a number M.

In step 1404, the UE identifies a value of M.

In step 1406, the UE determines, based on a condition on the value of M, a value of a parameter R.

In step 1408, the UE determines a precoding matrix indicator (PMI) indicating $N_3$ precoding matrices, where the number $N_3$ is determined based on the determined value of R.

In step 1410, the UE determines the CSI report including the PMI.

In step 1412, the UE transmits the CSI report.

In one embodiment, R=1 when the condition is M=1, and R∈S when the condition is M>1, where S is a set of values.

In one embodiment, the set S={1, 2}.

In one embodiment, the condition M>1 corresponds to M=2.

In one embodiment, the set S includes a number n<1.

In one embodiment, n=¼.

In one embodiment, R is configured from the set S via a higher layer parameter when the condition is M>1.

In one embodiment, the set S includes a number x and R=x is configured from the set S, when the UE reports being capable of supporting R=x.

FIG. 15 illustrates a flow chart of another method 1500, as may be performed by a base station (BS) such as BS 102, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the BS (e.g., 101-103 as illustrated in FIG. 1), generates configuration information about a channel state information (CSI) report, the configuration information including information about a number M.

In step 1504, the BS transmit the configuration information about the CSI report.

In step 1506, the BS receives the CSI report including a precoding matrix indicator (PMI); wherein the precoding matrix indicator (PMI) indicates $N_3$ precoding matrices, where the number $N_3$ is based on a parameter R that takes a value based on a condition on M.

In one embodiment, R=1 when the condition is M=1, and R∈S when the condition is M>1, where S is a set of values.

In one embodiment, the set S={1, 2}.

In one embodiment, the condition M>1 corresponds to M=2.

In one embodiment, the set S includes a number n<1.

In one embodiment, n=¼.

In one embodiment, R is configured from the set S via a higher layer parameter when the condition is M>1.

In one embodiment, the set S includes a number x and R=x is configured from the set S to a UE, when the UE reports being capable of supporting R=x.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver; and
a processor operably coupled to the transceiver, the processor configured to receive, from a base station via the transceiver, a higher layer parameter codebookTypeset to 'typeII-PortSelection-r17' for channel state information (CSI) reporting, receive, from a base station via the transceiver, configuration information on a CSI report, the configuration information including information associated with a value of M,
determine a value of a parameter R based on the value of M,
determine a precoding matrix indicator (PMI) indicating N precoding matrices, wherein N is determined based on the value of R configured with a parameter associated with a number of PMI subbands per channel quality indicator (CQI) subband, and
transmit, to the base station via the transceiver, the CSI report including the PMI, wherein
when M=1, R is set to 1,
when M=2, R is configured based on a higher layer parameter, and
R∈S, where S is a set of values and the set S={1,2}.

2. The UE of claim 1, wherein
when M=1 indicates that a discrete Fourier transform (DFT)-based frequency domain (FD) component of the CSI is turned off; and
wherein M=2 indicates that the DFT-based FD component of the CSI is turned on.

3. The UE of claim 1, wherein the processor is configured to:
transmit, to the base station, a UE capability information including information of supporting M=2.

4. The UE of claim 2 wherein the transceiver is further configured to transmit, to a base station, a UE capability information including information of M=2.

5. A base station (BS) comprising:
a transceiver; and
a processor operably coupled to the transceiver, the processor configured to
transmit, to a user equipment (UE) via the transceiver, a higher layer parameter codebookTypeset set to 'typeII-PortSelection-r17' for channel state information (CSI) reporting,
transmit, to the UE via the transceiver, configuration information on a CSI report, the configuration information including information associated with a value of M, and receive, from the UE, a CSI report including a precoding matrix indicator (PMI) indicating N precoding matrices;

wherein N is determined based on a value of a parameter R configured with a parameter associated with a number of PMI subbands per channel quality indicator (CQI) subband, and wherein when M=1, R is set to 1, when M=2, R is configured based on a higher layer parameter, and R∈S, where S is a set of values and the set S={1,2}.

6. The BS of claim 5, wherein M=1 indicates that a discrete Fourier transform (DFT)-based frequency domain (FD) component of the CSI is turned off, and wherein M=2 indicates that the DFT-based FD component of the CSI is turned on.

7. The BS of claim 5, wherein the processor is further configured to:

receive, from the UE, a UE capability information including information of supporting M=2.

8. The BS of claim 6, wherein the transmit is configured to receive a UE capability information including information of M=2.

9. A method for operating a user equipment (UE), the method comprising:

receiving, from a base station, a higher layer parameter codebookTypeset set to 'typeII- PortSelection-r17' for channel state information (CSI) reporting, receiving, from a base station, configuration information on a CSI report, the configuration information including information associated with a value of M;

determining a value of a parameter R based on the value of M;

determining a precoding matrix indicator (PMI) indicating N precoding matrices, wherein N is determined based on the value of R configured with a parameter associated with a number of PMI subbands per channel quality indicator (CQI) subband;

transmitting, to the base station, the CSI report including the PMI, wherein:

when M=1, R is set to 1, when M=2, R is configured based on a higher layer parameter, and R∈S, where S is a set of values and the set S={1,2}.

10. The method of claim 9, further comprising:

wherein M=1 indicates that a discrete Fourier transform (DFT)-based frequency domain (FD) component of the CSI is turned off, and wherein M=2 indicates that the DFT-based FD component of the CSI is turned on.

11. The method of claim 10, further comprising: transmitting, to the base station, a UE capability information including information of supporting M=2.

\* \* \* \* \*